United States Patent [19]
Roberts

[11] Patent Number: 5,107,273
[45] Date of Patent: Apr. 21, 1992

[54] ADAPTIVE STEERABLE NULL ANTENNA PROCESSOR WITH NULL INDICATOR

[75] Inventor: Eugene L. Roberts, Maitland, Fla.

[73] Assignee: The United States of America as represented by the Secretary of the Army, Washington, D.C.

[21] Appl. No.: 264,321

[22] Filed: May 11, 1981

[51] Int. Cl.[5] .............................................. G01S 5/02
[52] U.S. Cl. .................................... 342/417; 342/375; 342/379
[58] Field of Search .......... 343/100 SA, 854, 100 LE, 343/113 R, 417, 375, 379

[56] References Cited
U.S. PATENT DOCUMENTS
4,280,128  7/1981  Masak ............................. 343/854

*Primary Examiner*—Theodore M. Blum
*Attorney, Agent, or Firm*—Michael Zelenka

[57] ABSTRACT

An adaptive antenna array system steers a plurality of antennas to direct the null toward an undesired source of interference to reduce noise and enhance detection of desired signals. A null indication processing system adjusts the phase and amplitude of the antenna branches to steer the null and provide a null angle indication and display. Digital controller and memory circuits provide automatic operation.

7 Claims, 30 Drawing Sheets

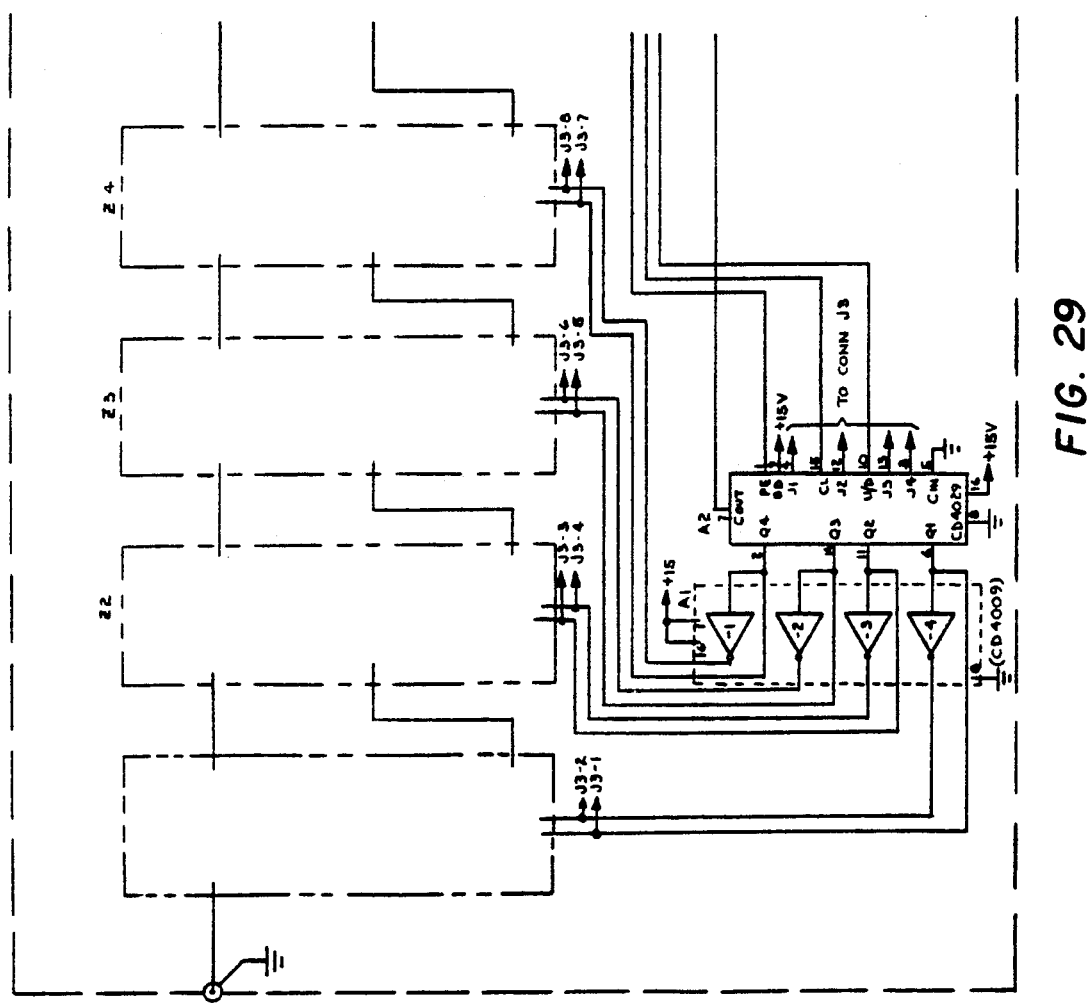

ADAPTIVE STEERABLE NULL ANTENNA PROCESSOR WITH NULL INDICATOR

GOVERNMENT LICENSE

The invention described herein may be manufactured and used by or for the Government for governmental purposes without the payment of any royalty thereon or therefor.

RELATED APPLICATION

This application is related to copending U.S. patent application Ser. No. 222,104, filed Jan. 2, 1981.

BACKGROUND OF THE INVENTION

1. Field of the Invention

This invention relates to radio receiving systems which adaptively suppress interference by controlling the null directivity of the pattern of an antenna array, and more particularly to a null indicator in such a system.

2. Description of the Prior Art

Adaptive array antenna systems are currently the subject of intense interest and investigation/development for radar and communications applications. The principal reason for the interest is their ability to automatically steer nulls onto undesired sources of interference, thereby reducing output noise and enhancing the detection of desired signals. These systems usually consist of an array of antenna elements and a realtime adaptive receiver-processor which has feedback control over the element weights.

Communications and radar antenna systems using either conventional narrow band or spread spectrum modulation formats are susceptible to degradation in SNR performance caused by undesired "noise" which intrudes via the antenna sidelobes and mainlobes. The noise may consist of deliberate electronic countermeasures (ECM), friendly RF interference (RFI), clutter scatter returns, and natural noise sources. This degradation is often further aggravated by a motion of the antenna, poor siting conditions, multipath, and a changing interference environment. Adaptive array techniques offer possible solutions to these serious interference problems via their flexible capabilities for automatic null steering and notching in the spatial domain, the frequency domain, and in polarization. Adaptive nulling is considered to be the principal benefit of adaptive techniques at the present time.

It is also possible that an unfriendly source of deliberate interference may possess the capability for monitoring the transmissions from the transceiver. It is therefore desirable not only to protect the receiver from the interference, but also prevent information from the transmitter from being intercepted.

Related prior art is listed in the aforementioned copending application Ser. No. 222,104.

SUMMARY OF THE INVENTION

The primary object of the invention is to provide a null angle indication for a steerable null antenna processor.

According to the invention, a steerable null antenna processor which includes variable phase and amplitude circuits for adjusting the relative phase and amplitude in two or more antenna branches to steer a null on an interference source is provided with display circuits to display the null angle in accordance with the contents of counters which control the variable phase and amplitude circuits. In systems having more than one null (more than two antenna elements), the null indication apparatus includes a read only memory which stores information for a cardioid pattern with a single null and the processor includes a direction finding mode with manual control. In this mode the controller varies the contents of an angle display counter whose outputs select the address of the read only memory and also generate display information to indicate the null angle.

BRIEF DESCRIPTION OF THE DRAWING

FIGS. 29 and 29A comprise a schematic diagram of the RTSNAP II delay line control circuits;

DETAILED DESCRIPTION

Figure 1:
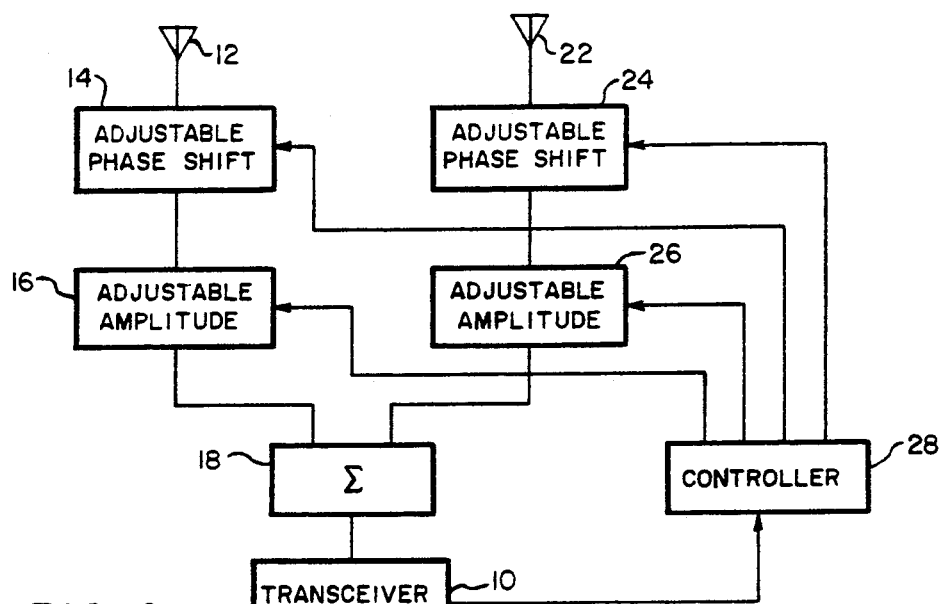
FIG. 1 is a diagram of a basic steerable null antenna processing system.

A basic adaptive steerable null antenna system is illustrated in FIG. 1. The radio transceiver 10 operates with a phased array antenna system which has a plurality of antenna elements, with two elements 12 and 22 shown. With a phased array, peaks or nulls of the antenna pattern may be set in a desired direction by adjusting the relative phase and amplitude of the radio frequency currents in the transmission paths between the antenna elements. If the phase and amplitude circuits are made adjustable, the pattern may be steered in a desired direction.

In FIG. 1, a steerable null antenna processor (SNAP) comprises adjustable phase shift circuits 14 and 24 for the respective antenna elements 12 and 22, respective adjustable amplitude circuits 16 and 26, a summer or signal combiner circuit 18, and a controller 28. The controller 28 may be operated either with manual controls, or automatically with a feedback signal. It supplies control signals to adjust the values of the circuits 14, 16, 24, and 26. This block diagram may be used to represent the system covered by U.S. Pat. No. 3,964,065 for a Steerable Antenna Null Combiner System, hereinafter SAN, and also in a general way for the systems disclosed herein (RTSNAP I and RTSNAP II). The combination of the adjustable phase and amplitude circuits may be referred to as vector multipliers.

Many modifications of the basic system are possible. There may be additional antenna elements. In general the maximum number of simultaneous interference sources that may be separately nulled is equal to the number of antenna elements less one. The elements may be directional in nature rather than omnidirectional. Spacing of elements in the array may be varied from quarter-wave to many wavelengths. Spacing on the order of three-eights of a wave length provides for good performance characteristics for many applications. One of the antenna elements may be used as a reference and coupled directly to the combiner 18 or the phase shift and amplitude circuits for one antenna element may be fixed at an intermediate value, since it is the relative phase and amplitude that need to be varied to steer the nulls.

The adjustable amplitude devices in FIG. 1 may be variable attenuators of various types. However if the null is to be maintained during transmission, attenuators are inherently wasteful of power.

PREFERRED EMBODIMENTS

As described in copending application Ser. No. 222,104 the preferred embodiments are represented by two designs, designated RTSNAP I for VHF operation, and RTSNAP II for UHF operation.

The first design, RTSNAP I, interfaces between two conventional center-fed vertical antennas and the RF input of transceivers for operation in the 30-MHz to 80-MHz frequency band. The second design, RTSNAP II, interfaces between four center-fed vertical antennas and the RF input of transceivers for operation in the 225-MHz to 400-MHz frequency band. Each RTSNAP design permits rapid manual and automatic nulling of the undesired signal or signals over a wide dynamic range in the receive mode while also permitting RF transmission at the latest null setting achieved in the receive mode. The design includes a nulling meter for monitoring maximum nulling in the receive mode, together with an easily interpreted digital readout for monitoring the relative null azimuth over 360 degrees. The design includes critical components for phase shifting and attenuator networks that have reciprocal high-power-level receive-transmit capability, octave bandwidth, wide dynamic range, and capability of being controlled incrementally by variable rapidly switching digital circuits. The RTSNAP design does not substantially degrade the near, far, and co-site performance of the receiver. Third order intermodulation and transmit spurious products are kept to a minimum. The digital processor circuits vary phase and amplitude in specified increments consistent with achieving 35-dB nulls and minimal null acquisition time. Both RTSNAP I and RTSNAP II have similar receive, transmit, and nulling performance requirements, resulting in similar design analysis and techniques with only a translation in operating frequencies.

The basic technical approach taken to fulfill the RTSNAP requirements uses an adaptive array technique. With this technique, the composite pattern of an antenna array is adjusted to provide the best match to a signal environment containing both desired signals and unwanted interference sources. The composite antenna pattern is adjusted for optimum reception and transmission in the direction of the desired signal while placing null(s) in the pattern in the direction of interferer signal(s). An idealized two-element array system would have phase and amplitude control circuits that operate efficiently at a high level output in reciprocal receive and transmit modes.

When considering nulling capability in a RTSNAP receive mode and the ability to transmit this same best-found composite antenna pattern in the transmit mode, the same accuracy of phase and amplitude control must be exercised in either RTSNAP mode.

While nulling in the receive mode, construction variations in calibration of the phase shifting and amplitude control devices or in antenna element performance can be compensated for by an adjustment procedure. If the same circuits are used without change for transmission as well as for reception, the transmitted null pattern is identical to the received null pattern.

For the high power level two-antenna-element approach, the output of the transceiver is fed through a low loss variable-ratio power splitter. A four-antenna system is configured as a dual two-antenna system combined through another low loss variable ratio power splitter. Received energy from each antenna element is processed by the phase and amplitude controls associated with each antenna element. In the receive mode where more than one signal is present at an antenna port, all signal vectors, desired and undesired, are rotated in phase and adjusted in amplitude by the same amount in that antenna element. Summing of these signal vectors processed by each antenna element's phase and amplitude control device results in a composite antenna array pattern. The shape of this pattern can be adjusted, with nulls positioned in the direction of undesired signals while retaining reasonable gain in the direction of desired signals. The signals are amplified and processed in a companion transceiver modem external to RTSNAP. In the transmit mode, an antenna pattern that is identical to the last receive-mode composite pattern adjustment is transmitted. This duplicate composite antenna pattern requirement implies phase and amplitude control devices with reciprocal transmission for stability. The companion receiver IF output is used to evaluate the pattern performance and provide the heuristic processor logic controlling each antenna element phase and amplitude control device with feedback signals on the relative improvement or degradation of the antenna pattern, for automatic mode of operation. The heuristic processor operates to select the most advantageous antenna pattern.

Octave bandwidth phase and magnitude control circuits for high-power-level signals limit the design technique approaches; however, components have been found that are within the state-of-the-art to meet the RTSNAP I and RTSNAP II requirements. By using PIN diode switched delay lines as phase shifting devices and a variable ratio power combiner as an amplitude control device, maximum transmit capability of 40 watts can be met or exceeded. Since these two devices are reciprocal to receive and transmit modes, the maximum receive mode energy is also 40 watts. With this design, the only distorting element in either the receive or transmit circuit paths are the PIN diode switches. The PIN diode acts as a resistor at RF frequencies in either its ON or OFF state, resulting in low intermodulation products. The PIN diode can be switched in just a few microseconds and will not offer any limitation to the automatic incremental adjustment or null acquisition time. The state-of-the-art of high power level PIN diode switching is well in excess of the 40 watts average RTSNAP requirement.

The RTSNAP system design includes provisions for separately monitoring null depth and null angle. Null depth monitoring over a 40-dB dynamic range is accomplished by monitoring the received signals from an output of the companion receiver IF amplifier. These IF signals are amplified by a logarithmic amplifier over the companion receiver's dynamic range, and may be monitored with the null depth meter. Monitoring the null angle representing the direction of undesired signals for RTSNAP I offers no serious design problems; however, in RTSNAP II where simultaneous multiple nulls can be obtained, ambiguity exists in determining the proper null.

The operator controls and digital controller are critical elements of the RTSNAP designs. The digital controller contains all control circuits necessary for correct system functioning and for interfacing between the companion receiver/modem S/I signal in automatic mode. The digital controller translates motion of the operator controls into effective digital commands in the manual mode. In the automatic mode, a heuristic digital controller duplicates an operator's decisions and manual control in improving the signal-to-interferer ratio in a faster and less tedious manner. This automatic mode will also result in a means of tracking moving interferers.

Digital designs are used that utilize up-down counters to control the phase shifter and attenuators. The granularity of the digitally controlled phase shifters and attenuators has been chosen such that the resultant desired signal can achieve a minimum of 35-dB advantage over the undesired signal. Use of digital control for the null positioning circuits of the RTSNAP readily adapts the system to manual, automatic, or remote operation.

The basic technical approach taken to fulfill the RTSNAP requirements uses an adaptive array technique. With this technique, the composite pattern of an antenna array is adjusted to provide the best match to a signal environment containing both desired signals and unwanted interference sources. The composite antenna pattern is adjusted for optimum reception and transmission in the direction of the desired signal while placing null(s) in the pattern in the direction of interferer signal(s).

Figure 2:
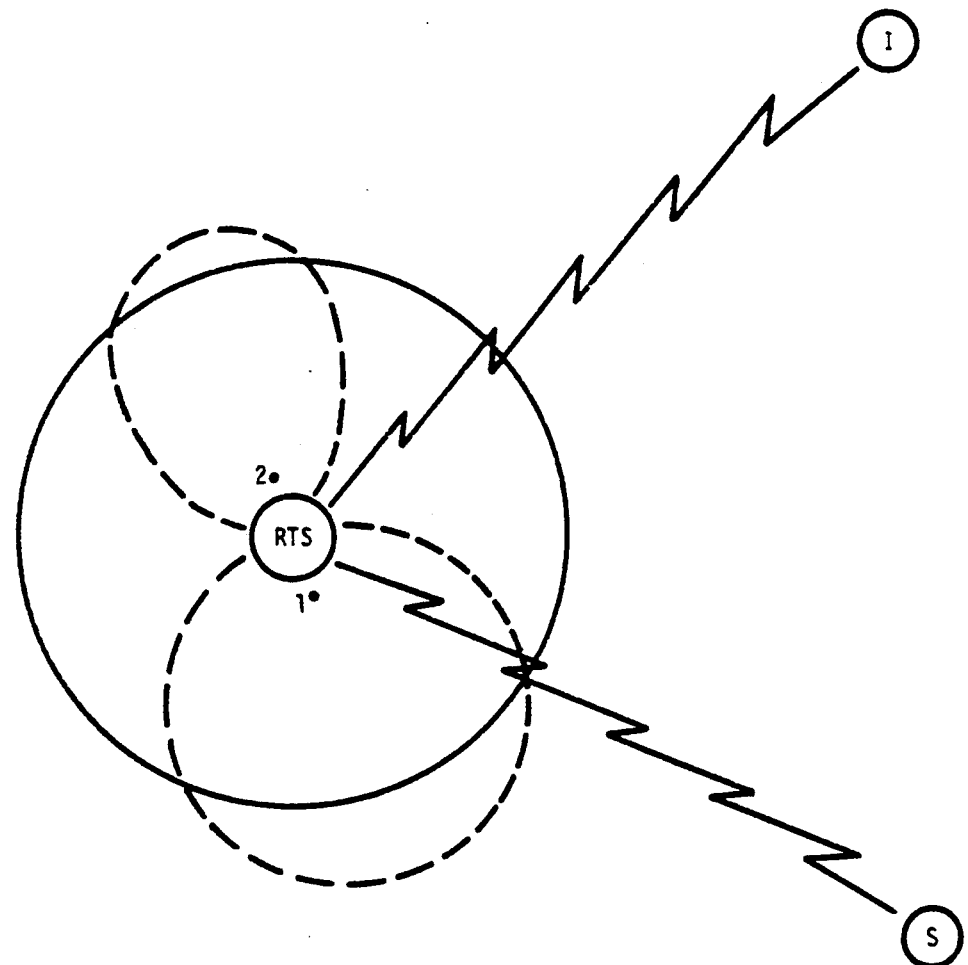
FIG. 2 is a diagram showing antenna patterns.

The adaptive antenna technique used in RTSNAP is best described through consideration of a simple, two-element, adaptive-antenna receive system. In FIG. 2, the large circle depicts the azimuthal plane radiation pattern that would be expected to result from a single element antenna. No preference is given to any direction of arrival, and if the signal-to-interference ratio is measured at the single element antenna output to provide an index of system performance (A), then $A = S/I$. If an additional antenna element is added and controllable vector multipliers are placed in series with each antenna output with systems performance then measured by using the sum of the two vector multiplier outputs, the dashed line array pattern is realized with proper vector multiplier adjustment. The system performance when using two elements is the $A = k(S/I)$, where k is the null depth referenced to the signal antenna element pattern. Null depths substantially in excess of 35-dB may be achieved by using this technique. The use of the two-element approach also provides a theoretical improvement of 3-dB in gain in directions remote from the null directions. If the vector multipliers are bilateral, then the same configuration may be used to provide identical transmit and receive patterns.

Figure 3:
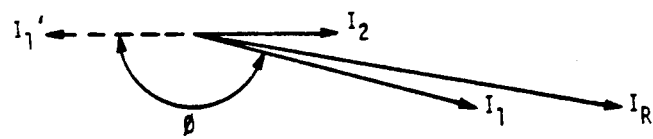
FIG. 3 is a vector diagram of antenna port signals and processed resultants.
Figure 3:
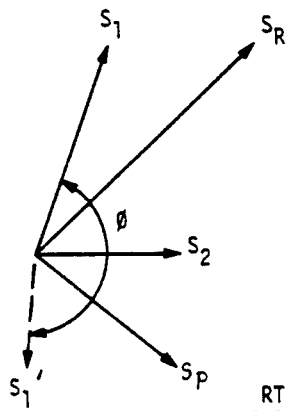

FIG. 3 is the vector representation of signals arriving at the antennas of the previous figure, from signal sources as indicated by the symbols (I) and (S) on that figure. From the diagrams, an example of the initial resultant vectors (sum of the signals from antennas 1 and 2) with an unnulled RTSNAP shows the signal from the interference source I being greater than the signal from the desired sources S. By equally shifting the phase of both signals from antenna 1 and equally adjusting both signal amplitudes, it can be seen that the $I_1$, vector can be adjusted to cancel the $I_2$ vector, eliminating the signal. The $S'_1$ vector, the rotated and attenuated $S_1$ signal, combines with the $S_2$ vector in the summing network, resulting in a weaker but useable signal Sp from the desired source. The vector diagrams are idealized in that it is assumed that the $I_1$ vector can be phase shifted and attenuated to exactly cancel the $I_2$ vector. Even with complicated and expensive analog circuits, component and system tolerances as well as field condition variations result in drifts that will not permit exact cancellations, and a residue interference signal will exist. However, a very significant improvement in S/I is achieved.

A two-element array system has delay and amplitude control circuits which operate efficiently at a high level output in reciprocal receive and transmit modes with minimum insertion loss. It follows that a four-antenna system can be configured as a dual two-antenna system combined through another lossless, variable ratio power splitter. Received energy from each antenna element is processed by the delay and amplitude controls associated with each antenna element. In the receive mode where more than one signal is present at an antenna port, all signal vectors, desired and undesired, are delayed in time and adjusted in amplitude by the same amount at that antenna element. Summing of these signal vectors processed by each antenna element's delay and amplitude control device results in a composite antenna array pattern whose shape can be adjusted with pattern nulls positioned in the direction of undesired signals, while retaining reasonable gain in the direction of desired signals. The signals are amplified and processed in a companion transceiver modem external to RTSNAP. In the transmit mode, an identical antenna pattern is transmitted that is the last receive-mode composite pattern adjustment. This duplicate composite antenna pattern requirement implies delay and amplitude control devices with stable reciprocal transmission paths. For automatic mode operation, the companion receiver IF output is used to evaluate the pattern performance and provide the heuristic processor logic controlling each antenna element delay and amplitude control device with feedback signals on the relative improvement or degradation of the antenna pattern. The heuristic processor forms the most advantageous antenna pattern.

Figure 4:
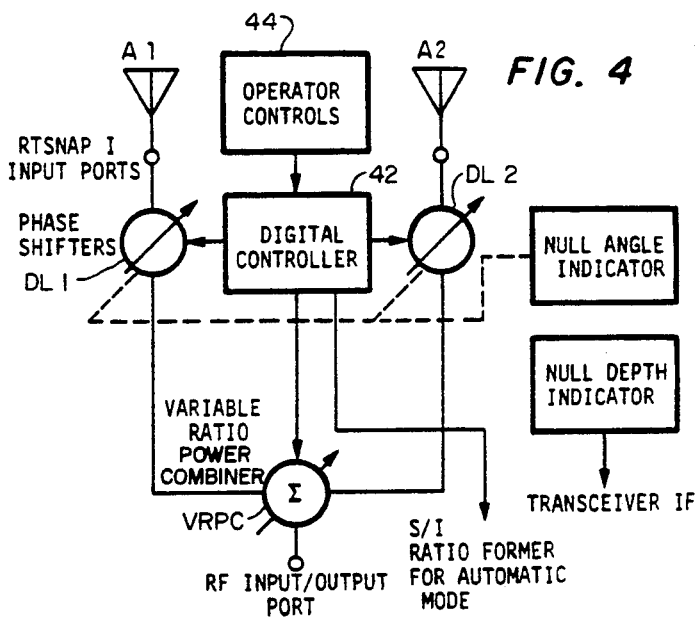
FIGS. 4 and 5 are block diagrams of a system RTSNAP I with two antenna elements.
Figure 5:
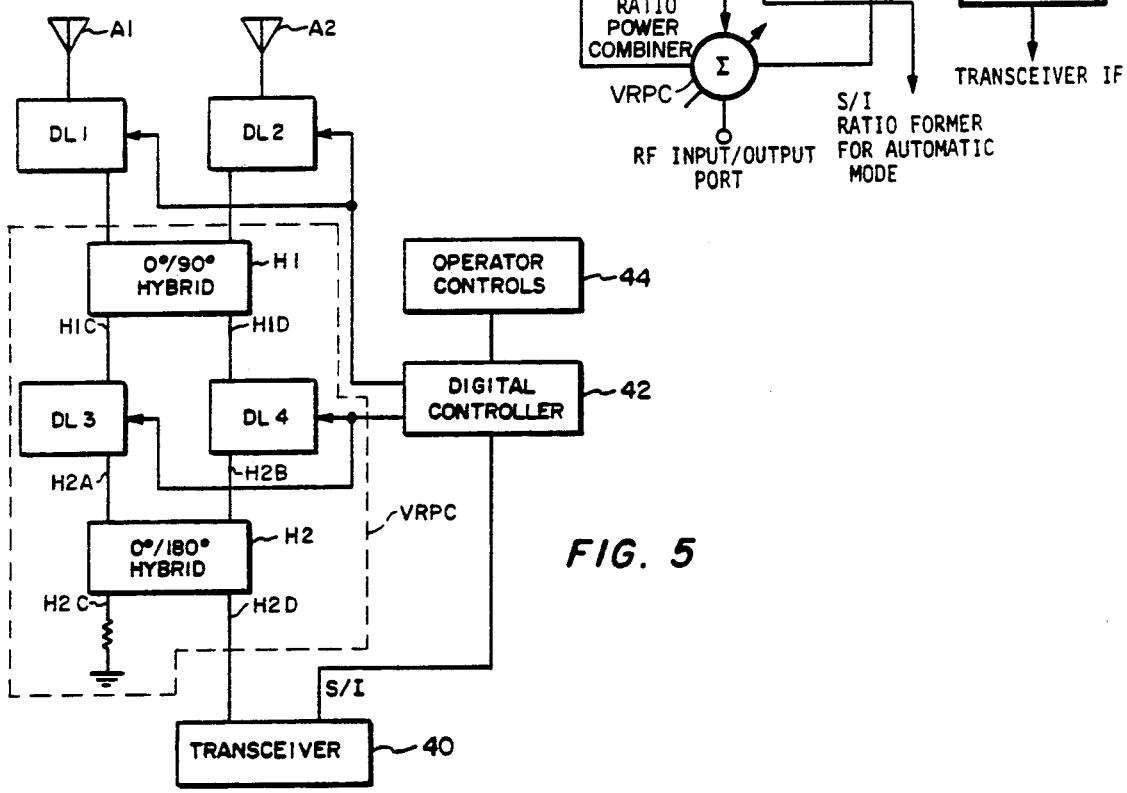
Figure 6:
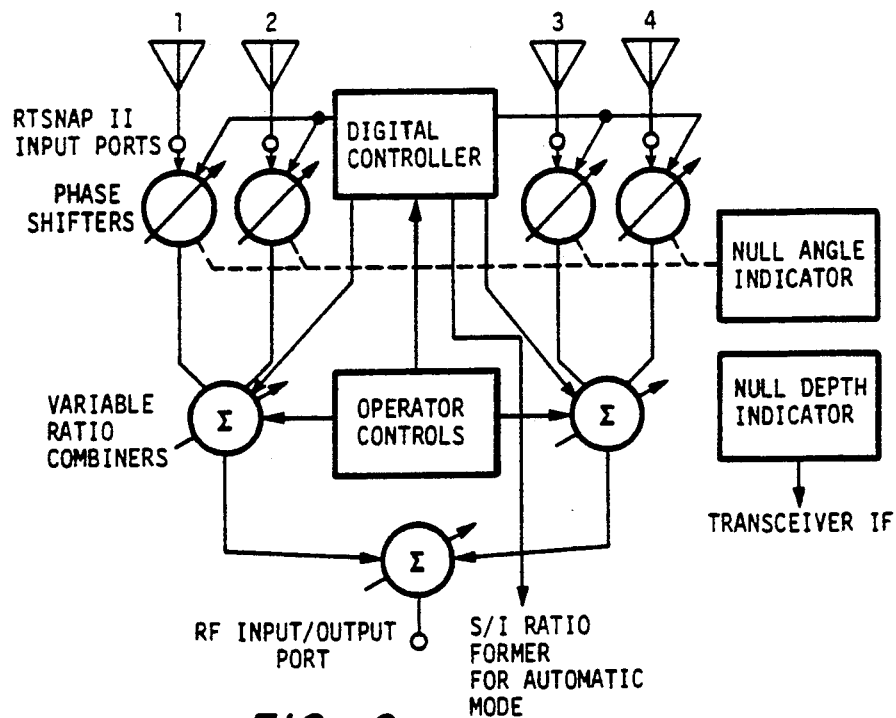
FIGS. 6–8 are block diagrams of a system RTSNAP II with four antenna elements.
Figure 7:
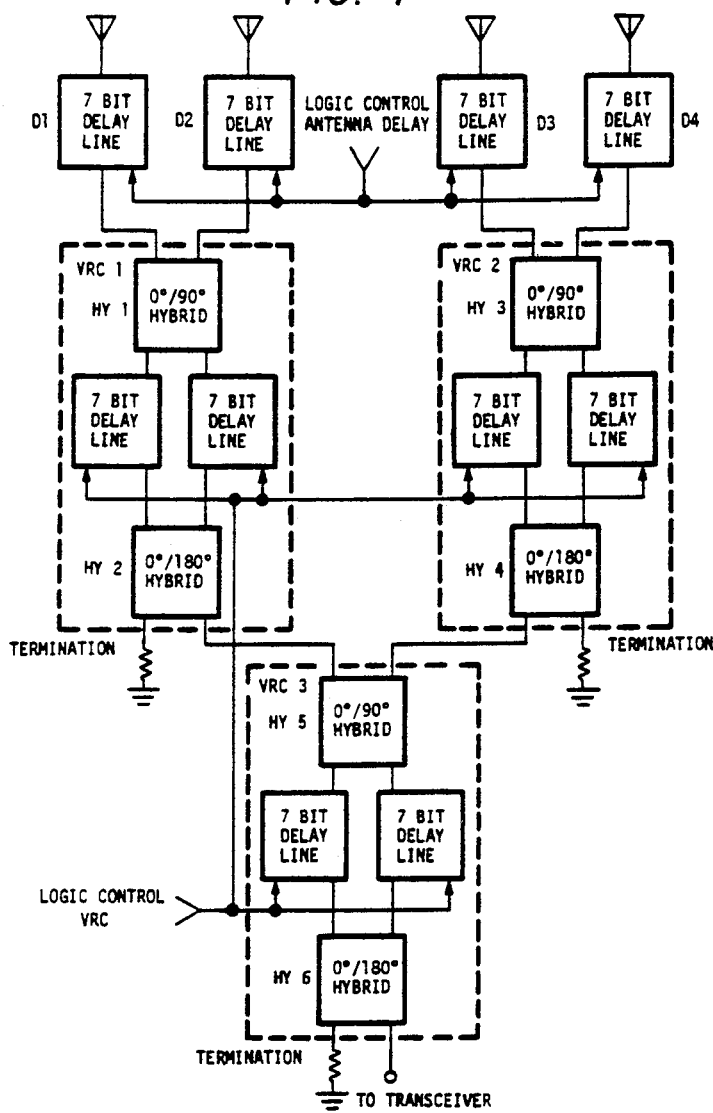
Figure 8:
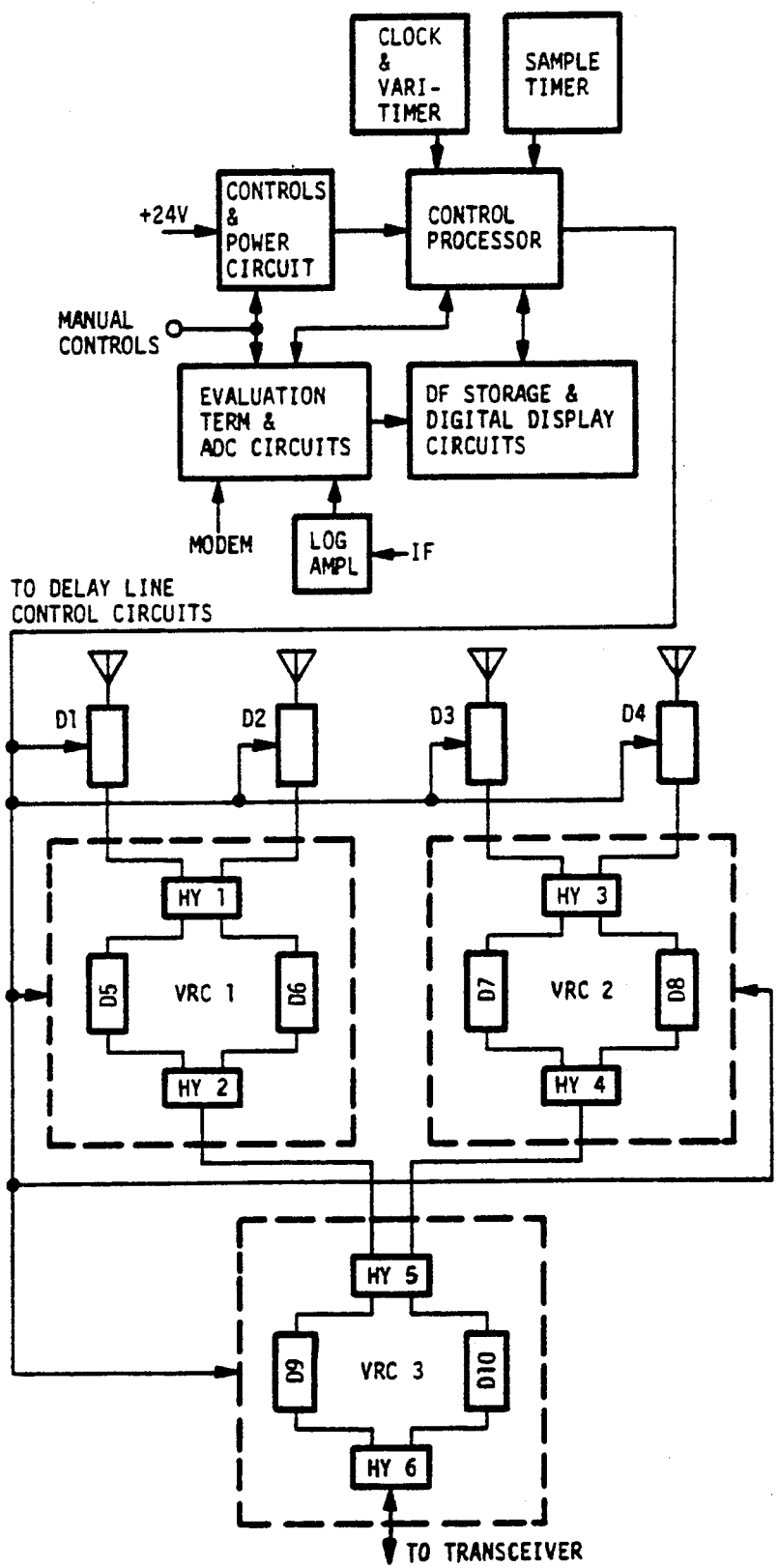

The general system design of RTSNAP I FIGS. 4 and 5 and RTSNAP II (FIGS. 6-8) is very similar with respect to the basic RF circuit configuration and the logic control unit for the manual and automatic control modes. The RF circuit designs of RTSNAP I and RTSNAP II are very similar, consisting primarily of PIN diode switched delay lines, quadrature, and 0/180 degree hybrid junctions. The switched delay line connected as a binary seven-bit delay line phase shifter provides a means of varying the differential delay of the RF energy between antenna elements in 128 incremental delay steps. Likewise, two similar binary seven-bit switched delay lines connected between the output ports of the quadrature and 0/180 degree hybrids in a variable ratio power combiner configuration provide a means of varying the ratio of the power between antenna elements. The RF circuit of RTSNAP I, the two-antenna-element unit, consists of a binary seven-bit switched delay line phase shifter in each antenna element, combined through a variable ratio power combiner VRPC to the tactical transceiver, FIGS. 4 and 5. RTSNAP II, the four-antenna-element unit, consists of two RTSNAP I RF circuit configurations connected to the four antenna inputs, with their outputs combined through another VRPC, and then on to the tactical transceiver as shown in FIGS. 6-8. Only the binary delay line lengths, stripline circuit dielectric material, and physical size are different in the RF circuits of RTSNAP I (30 to 80 MHz) compared to RTSNAP II (225 to 400 MHz). A binary seven-bit switched delay line is configured as a stripline module, with the delay lines etched on printed circuit boards of controlled dielectric constant and sandwiched between two aluminum plates. These stripline modules of the seven-bit delay line are stacked in a row and used as either a phase shifter or amplitude control in a variable ratio combiner configuration. The RF circuits are kept separate from the logic drive circuits, thereby resulting in identical RF modules of the seven-bit delay lines.

In the following sections a detailed description of the RTSNAP I and RTSNAP II RF circuit design plan is presented, followed by a detailed description of the switched delay line and variable ratio power combiner VRPC, and then circuit descriptions of the RTSNAP I and II control and indicator circuits.

The RTSNAP I unit interfaces between two center-fed vertical antennas and the RF input of tactical transceivers, permitting rapid manual and automatic nulling of undesired signals over a wide dynamic range in both the receive and transmit modes for all signal azimuths.

FIG. 4 illustrates the RTSNAP I system configuration of six major subsystems:
1 Antennas
2 Phase Shifters
3 Variable power dividers
4 Null angle indicator
5 Null depth indicator
6 Digital controller and operator controls.

The null combiner must have the capability of adjusting the power level and phase of an interfering signal in each antenna element to produce a cancellation of that signal's vectors after summing. This results in a null in the azimuthal direction of the undesired signal. For RTSNAP I, the radiation intensity from each antenna element must be equal in the desired direction of nulling or a deep null cannot be achieved. Thus, the element pattern (as measured within the array plane) is of importance, for if the element patterns orient at different angles, and the element pattern varies in gain by 5dB, then RTSNAP I must provide an internal power ratio capability to correct for this element directional power gain difference. Although antenna array design is not a part of the RTSNAP design plan, careful selection by the user is desirable to minimize the power losses due to mismatch to the RTSNAP unit during transmission.

The vector multiplier, which includes the delay line phase shifter and variable ratio combiner VRPC in this design, interfaces directly with the RTSNAP I antenna ports. This design offers reciprocal receive and transmit operation at a 40 watt level with high transmit efficiency and low insertion loss. The vector multiplier phase shifter consists of a binary seven-bit PIN diode switched delay line. Similar seven-bit delay lines are used as the control mechanism that adjusts the amplitude from the output ports of the VRPC in any desired ratio over a 30 dB range. Two seven-bit delay lines are used in the VRPC, and are varied in equal delay increments and opposite directions to produce a variable amplitude ratio with constant phase differential. The delay lines in the VRPC are driven simultaneously in 128 incremental steps. Also, the seven-bit delay lines for each antenna element are controlled by a common eight stage up/down counter in 128 incremental delay steps, for a total differential delay adjustment capability of 256 incremental steps. The antenna elements' delay lines will initially be set for minimum delay, with the heuristic controller designated to optimize on a minimum differential delay setting between antenna elements to achieve a null using the shortest delay line segments possible. This avoids the longer delay bits that result in 180 degree phase shift when an octave bandwidth is exceeded.

The PIN diode SPDT solid state switches are used to switch the transmission delay line element bits in binary steps. The arrangement for switching control of the PIN diodes is disclosed in my copending application Ser. No. 180,554 filed Aug. 25, 1980 for Switched Delay Line for Steerable Null Antenna System.

Figure 9:
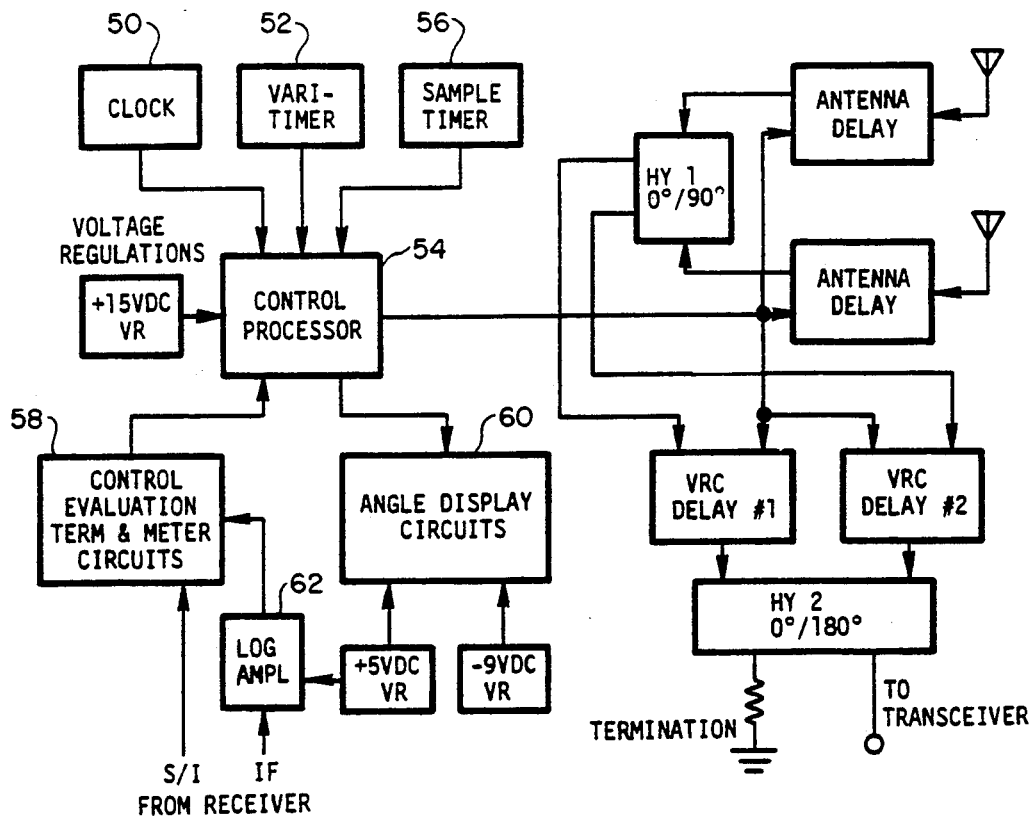
FIG. 9 is RTSNAP I functional block diagram.

A functional block diagram of RTSNAP II is shown in FIG. 9 to illustrate the control processor and its pertinent logic and control functions. High Beta transistor switches are used to drive counters in the control processor drive the PIN diode switches' transistor drivers, to control the delay line in 128 incremental increasing or decreasing delay sets in each antenna element. Likewise, an amplitude control seven-stage up-down counter controls the two delay lines in the combiner VRPC in opposite delay directions and in equal 128 step incremental steps.

The system clock 50 provides the basic timing for the control logic circuits, which include a manual mode sequencer and an automatic control mode sequencer. The varitimer circuits 52 ar used only in the manual control mode. In manual mode, when the operator first presses the four way function control switch to either amplitude or delay, increasing or decreasing, the varitimer starts the basic clock timing pulses to the amplitude and pulse delay lines at a very slow rate. As the operator continually presses the function switch, the varitimer output clock rate increases to a fixed maximum rate compatible with operator reaction time. This allows the operator a variable rate of control, slow when in deep nulls to change one delay increment at a time, and fast when trying to achieve a rapid approximation of the null before final sensitive deep null adjustment.

The automatic mode control circuits are contained in the control processor 54, sample timer 56, and control evaluation term and meter circuits 58 as shown in FIG. 9. The operator simply switches a front panel mode selector switch to AUTO in a RTSNAP receive mode, and the unit will automatically null interference(s). An automatic sequencer steps through a logic sequence, changing first delay and then amplitude differential between the two antenna elements, in such a direction as to improve the received signal to interference (S/I) ratio. The S/I voltage term is derived in the companion receiver, and is applied to the RTSNAP as the evaluation term in the automatic control mode. This evaluation S/I term is then applied to a sample and hold circuit and compared against the last S/I sample for improvement or no improvement. The heuristic logic sequence in the automatic control mode continually searches, with delay and magnitude adjustments in each antenna element, for improvement in the received S/I ratio. An automatic power leveling mode is also included to automatically place a null in the direction of the strongest received signal source. This mode will be used when an interferer is known to be much stronger than the desired signal. An IF input (before limiting) from the companion receiver is amplified by a wide dynamic range log amplifier in the RTSNAP, to provide an evaluation term to the same sample and hold circuit that is used in the automatic nulling mode. In this case the heuristic logic controls the phase and amplitude adjustment in the delay lines for maximum signal. The logarithmic amplifier 2 can provide over 100 dB dynamic range of the received signals for the front panel meter. A front panel meter scale adjustment provides a means of displaying 40 dB of signal range, out of the 100 dB dynamic range.

The RTSNAP transmit mode can function in the manual, power leveling, or automatic nulling control modes. The system timer is inhibited during the transmit mode, and the transmit array pattern will be that of the last pattern achieved in the receive mode.

RTSNAP I CONTROL AND MONITOR CIRCUITS

The RTSNAP I control and monitor functional block diagram is shown in FIG. 9. The basic circuit functions are:
1 Clock 50
2 Varitimer 52
3 Control Processor 54
4 Sample Timer 56
5 Control Evaluation Term and Meter Circuits 58
6 Angle Display Circuits 60

By front panel controls an operator can select three modes of RTSNAP control: manual, power leveling, or automatic modem. The control processor and related logic circuits provide digital control to adjust the differential delay and amplitude of input signals between two antenna elements to achieve a null in the direction of an interferer. The system clock provides the basic time pulses for the manual and automatic logic functions and sequences. The varitimer is used in the manual mode only, and is a variable rate clock that varies as the operator presses the four way joystick, to control the rate of change of the delay line or combiner VRPC incremental control. The control processor contains the central control logic for either the manual or automatic mode. The sample timer 56 and evaluation term circuits 58 are used in the automatic modes. The controls circuit provides an interface between front panel manual and automatic controls and the central processor. The angle display circuits 60 convert the eight-bit digital output of the antenna delay counter to a three-digit LED display of null angle position, upon operator front panel command. A logarithmic video input provides the evaluation term of the meter and control circuits.

Figure 10:
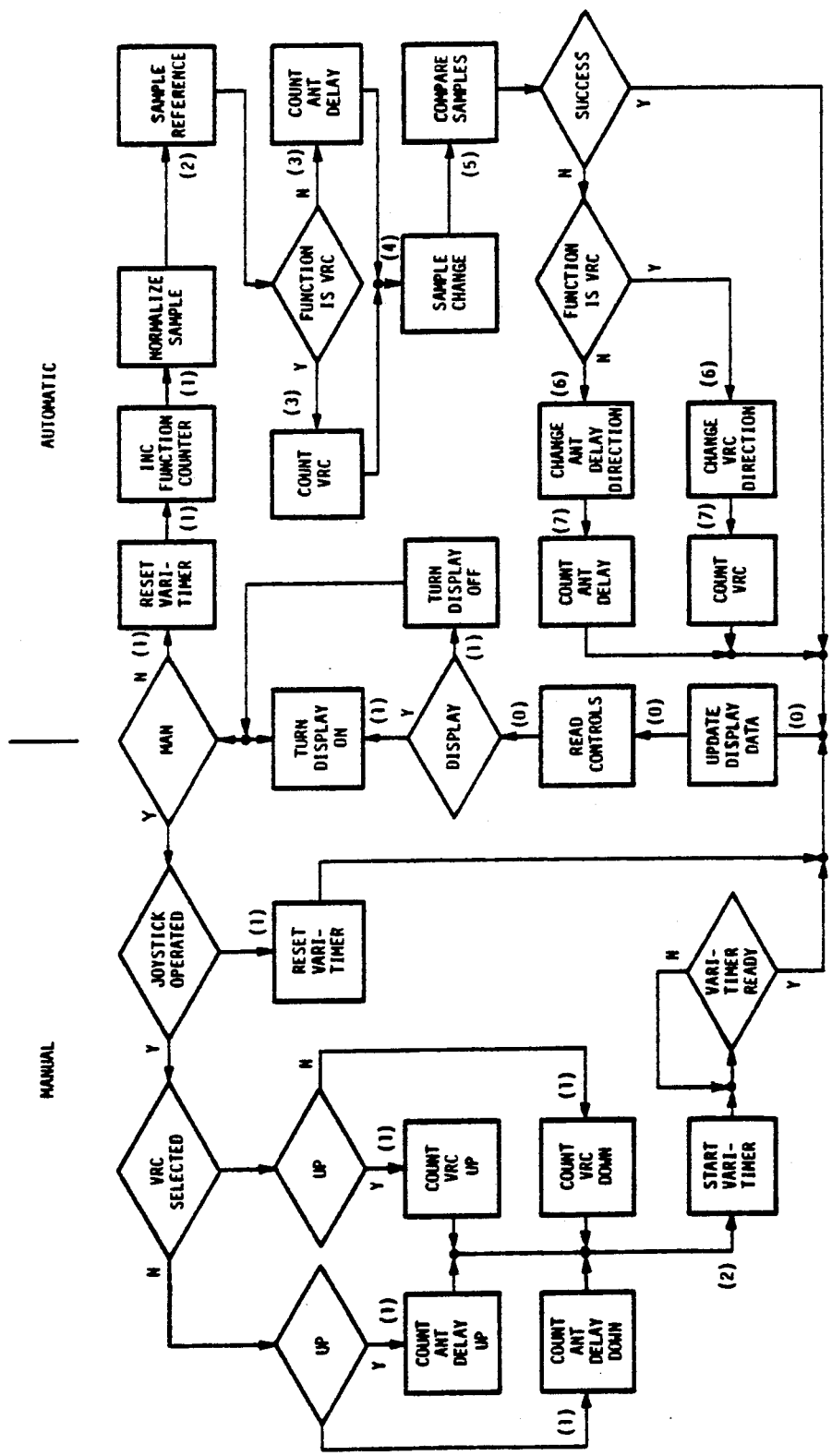
FIG. 10 is a RTSNAP I process flow diagram.

The simplified RTSNAP I process flow diagram illustrated in FIG. 10 contains the basic manual and automatic control function necessary for achieving a null or power leveling of antenna input signals. Once the primary power has been turned on, the operator selects the mode of operation he desires. For manual control, he rotates the three-way rotary switch to MANUAL and presses the MODE SELECT pushbutton. The operator can then operate the joystick control in the following manner:
1 Amplitude (VRPC) increase—UP direction
2 Amplitude (VRPC) decrease—DOWN direction
3 Delay increase—LEFT direction
4 Delay decrease—RIGHT direction By positioning the four-way joystick, the operator selects VRPC control (amplitude) or delay line control (phase) in either increasing or decreasing increments. When the operator first presses the four-way control, the varitimer begins clocking the amplitude or delay incremental control bits at a slow rate. This controlling clock rate increases as he continues to press the four-way joystick in the same direction. If the operator should change direction or function, the varitimer starts again at its slow rate. This aids the operator in achieving a single binary bit change in amplitude or delay while in a deep null. The faster clock rate capability is to speed up initial acquisition of a null in the direction of an interferer. This manual cycle can be repeated until maximum null is obtained. The operator can display the interferer angle by pressing the DISPLAY BEARING pushbutton. The three digit LED display is continually updated to show the latest antenna delay line settings. The front panel display is strobed by a TURN ON command initiated by the front panel pushbutton control. This strobing of the LED display conserves power.

The operator selects the automatic control modes by positioning the three-way rotary switch to either POWER LEVELING or AUTOMATIC MODEM, and then pressing the MODE SELECT pushbutton. The selection of power leveling or automatic modem mode also selects the proper control evaluation term for automatic feedback control between the RTSNAP I and the transceiver. The varitimer is reset and not used in the automatic control modes. The system clock initiates the basic timing for the heuristic sequence control logic. On first entering the control loop, the function counter delay or VRPC) is changed from its last function control. For example, when changing from delay control to VRPC control, the evaluation term for the new function control, VRPC, is sampled and held as a reference. Since the function is now VRPC, the next logic decision to advance the VRPC control counter one increment and then sample the evaluation term again and compare it to the previous sample reference. The differential increase or decrease of the evaluation term for this incremental change indicates the success or failure of improving the received S/I ratio or signal focus power leveling term. If successful, the display storage circuits are updated, the automatic loop is reentered, and the loop cycle repeated. The angle display can be activated by the operator at any time, to read the latest null angle delay line setting. If no success had been achieved in the initial assumed VRPC control automatic mode, the logic decision is then to change the VRPC direction and return to the initial VRPC reference setting. The automatic cycle reenters the start of the automatic loop and the function is changed to delay control. The automatic cycle then continues, constantly changing from delay to VRPC control, in increasing or decreasing directions, looking for improvement in the control evaluation term to improve the overall received signal S/I.

NULL ANGLE INDICATION

Two Element Array

When nulling a signal with a two element antenna array and associated signal processor, the relative angle of the signal is useful information for many applications. The relative angle of arrival is related to the specific differential phase or delay necessary in the element paths to produce the delay. In adaptive antenna systems such as RTSNAP I or SAN, this differential phase or delay is set internally during the nulling process and may be decoded by additional means to give relative angle of signal arrival.

Figure 11:
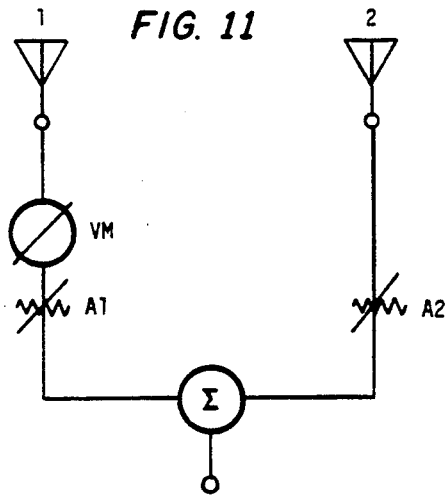
FIGS. 11 and 12 are diagrams to illustrate null angle identification in RTSNAP I.
Figure 12:
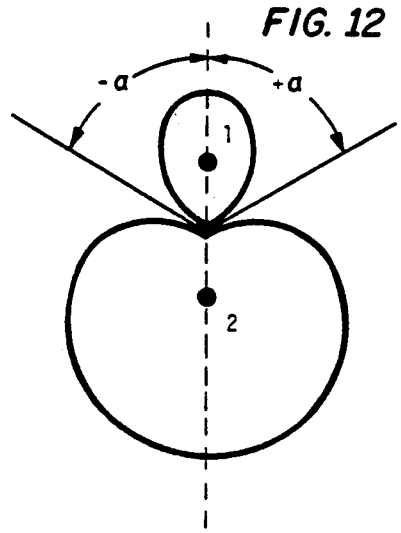

The general arrangement of the null angle indication technique is shown in FIG. 11. In series with antenna 1 is shown a phase shifter that provides a change in signal angle as the phase shifter is operated by external means necessary to provide the antenna 1 signal vector 180° out of phase with the antenna 2 signal vector at the summer output. Attenuators A1 and A2 are provided to adjust the amplitude of the signal vector from antenna 1 and the amplitude of the signal vector from antenna 2 to equal amplitudes to permit deep cancellation or nulling. The array pattern resulting from null a signal located at either + or −α from the element line reference is shown in FIG. 12 and is symmetrical, with null readings from the two element array necessarily ambiguous.

The settings of attenuators A1 and A2 do not influence the null angle. For specific spacings of the antenna element phase centers, the setting of the phase shifter defines the null angle α. For a delay line type phase shifter, the differential delay required to produce a null in a specific direction remains constant irrespective of frequency provided that frequency dependent interaction of the antenna elements is acceptable. For a broadband phase shifter, the differential delay required to produce a null in a specific direction is a function of effective antenna spacing in wavelengths, and to retain a constant phase shifter setting irrespective of frequency, the antenna spacing must be varied with the wavelength of the signal nulled.

Figure 12A:
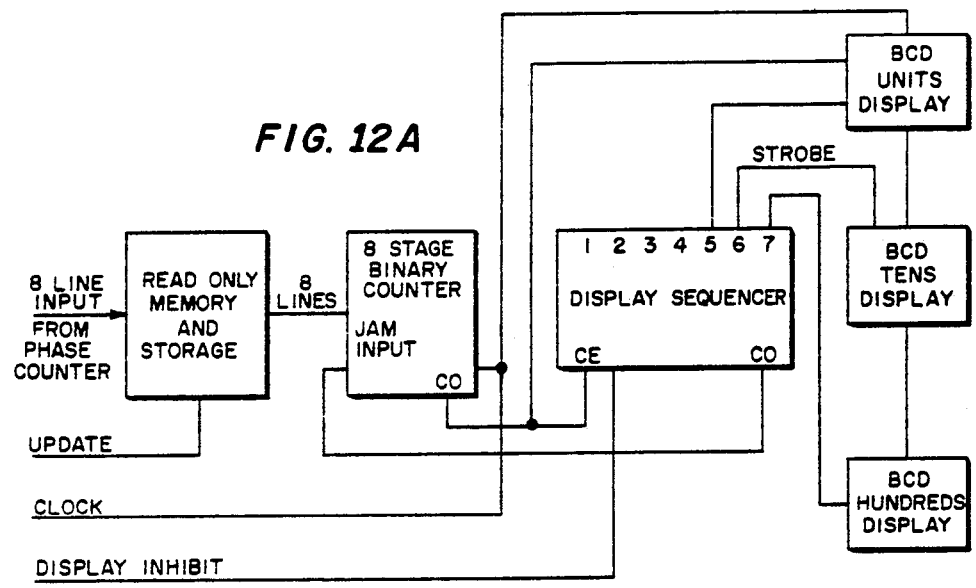
FIG. 12A is a block diagram of the RTSNAP I Angle Indicator.

The differential phase or delay of the phase shifter may be determined from associated binary control circuits for the two antenna nulling systems constructed or envisioned. The binary phase or delay information may then be decoded into digital angle information by a read only memory as shown in FIG. 12A. The binary phase or delay is used as address for the ROM and the 8 bit output word is a binary representation of the arrival angle. The 8 binary output bits are converted to BCD and displayed in decimal form.

Addressing of the read-only memory (ROM) is constantly updated automatically by a sequence counter in the control processor (not shown). An update pulse strobes the ROM and its output latch to store the last phase angle setting to conserve power by using the read-only memory only when needed. The latch storage gate is CMOS and consumes very little power. When the operator presses the front panel BEARING DISPLAY switch (not shown), a display inhibit pulse is removed from a display sequencer seven-stage counter. The display sequence begins counting with the clock once the inhibit has been removed, and sets a gate to prepare for the sequential readout of the null angle setting. After a count of four, a carry-out pulse from the even-stage display sequencer loads the eight input lines from the ROM's storage latch into an eight-stage parallel-to-series counter. The seven-stage display sequencer will pause until the eight-stage binary-to-series counter counts to all zeros from its preset jam input representing the angle. A carry-out pulse from the eight-stage parallel-to-series counter steps the seven-stage display sequencer one count and also recycles to its maximum count and counts down again to all zeros. As the eight-stage parallel-to-series counter counts down to zero, the clock also counts the three cascade binary-to-decimal counters up by the same count until the carry out pulse occurs at all zeros and then inhibits the binary-to-decimal decoder from further counting. For the next three recycles of the eight-stage parallel-to-series counter, the seven-stage display sequencer is advanced three times to strobe the binary-to-decimal decoder first in units, then tens, then in hundreds of degrees. This strobing conserves the power consumed by the LED display and continues sequential digit display at a fast enough rate that the display will look continuous. An updated angle indication will be displayed as long as the operator presses the BEARING DISPLAY front panel pushbutton.

Advantages

Prior nulling devices gave no indication of null angle. Providing null indication permits pre-pointing nulls in the directing of previously known interference. Ability to determine null angle permits auxiliary use of the nulling device as a direction finding unit. Use of binary to decimal conversion with display multiplexing as shown in FIG. 12A reduces power consumption.

Equivalents

Binary switched time delay phase shifters, rho-theta phase shifters (SAN) and other quantized phase shift control means can provide the required input identified as 8 line input in FIG. 12A. More or less than 8 bits may be used dependent upon needed accuracy. If dual phase shifters are employed where one is used in series with each of the two antennas, a multi-bit adder such as the CD4008A may be used to calculate the differential phase needed for the 8 line input in FIG. 12A. A read only memory with 9 bits out would permit elimination of the binary to decimal decoding while providing two integers for units and tens of four bits each and a single bit for hundreds providing integer outputs from 0° to 180°.

Four Element Array

For a four element array with multiple nulls possible, determination of which null is directed toward which signal is complex and difficult.

Three independent nulls may be generated by the four-element combination permitting nulling of up to three independent interference sources to display interferer positions when simultaneous nulls occur. Such an arrangement requires a separate direction finding (DF) control mode. A fixed cardioid composite antenna pattern is generated by pre-programmed memory circuits that control the four antenna delay line settings and three Variable Ratio Power Combiner (VRPC) settings, to produce a 360 degree null angle visual display indication in 2 degree increments. The operator switches to the DF mode, and operates a four-way joystick to rotate the fixed cardioid null through 360 degrees to determine in succession the relative angular position of each interferer with respect to the antenna array orientation.

Figure 15:
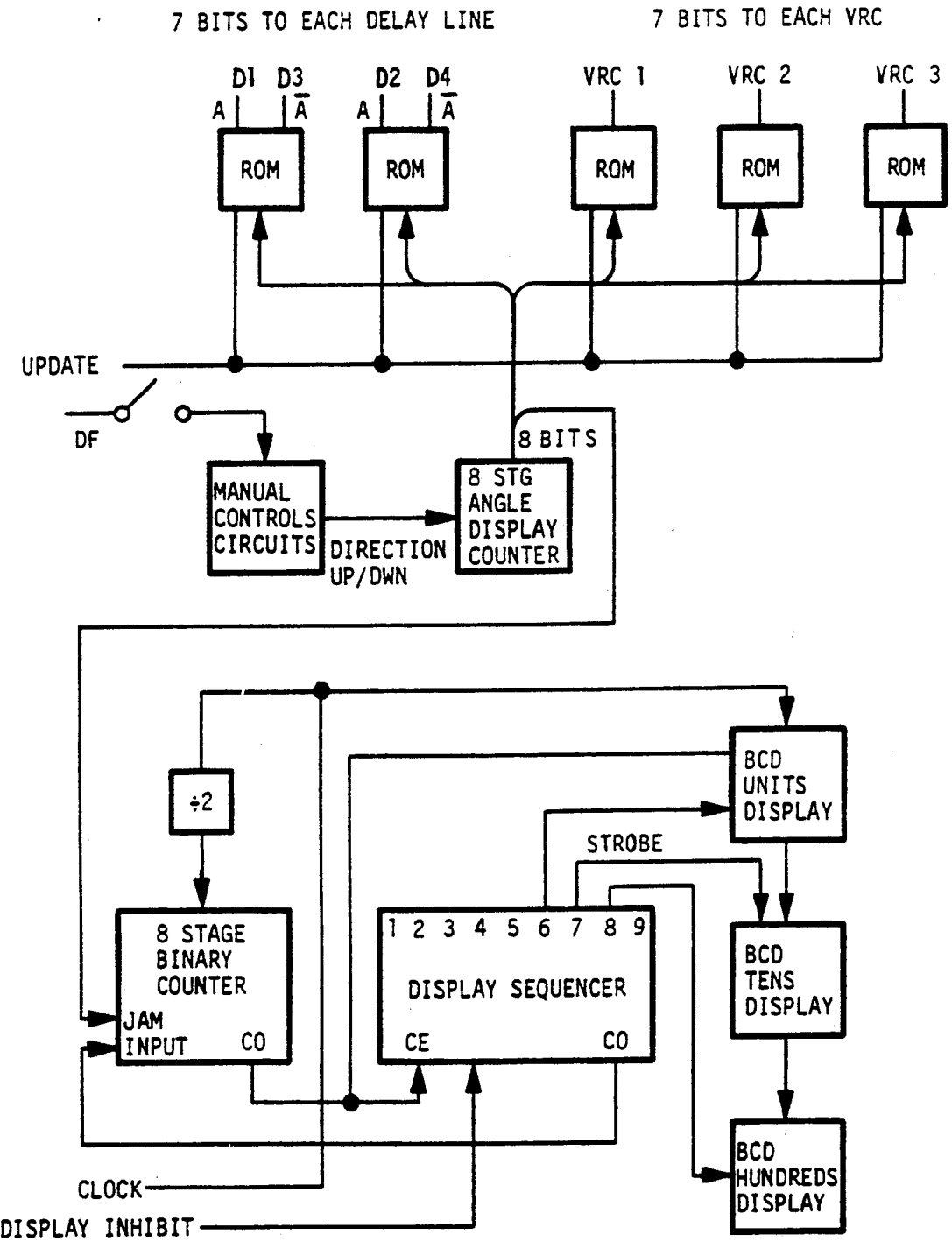
FIG. 15 is a block diagram of the RTSNAP II angle display circuit.

The block diagram of the angle display circuit is shown in FIG. 15. The eight-stage parallel-to-serial counter, display sequencer, binary-to-decimal converter, and LED display are used with memory circuits to generate predetermined cardioid antenna patterns. When the operator switches to the DF mode, he controls the rotation of the cardioid pattern null by means of left-right motion of the four-way front panel joystick control. A left control direction is for decreasing angle and a right control direction is for increasing angle direction. Through operator initiation, the DF control circuits supply preset and direction inputs to the eight-stage display up-down counter to produce an eight-bit output representing angle displacement in 2 degree increments. The varitimer control circuit is also used in the DF mode to provide a variable rate operator control for rapid or incremental angle display adjustment by means of the four-way joystick. For each 2 degree increment through 360 degrees, the read only memory (ROM) is programmed to provide delay line and VRPC settings to generate a composite cardioid antenna pattern. New angle information is continually updated by a strobe pulse from a manual control sequencer in the control processor, reducing power drain by using the ROM only when needed. The eight-bit binary word representing angle is also applied as a jam input to an eight-stage binary parallel-to-serial counter.

When the operator rotates the select switch to DF and presses the MODE SELECT pushbutton, a display inhibit pulse is removed from the display sequencer nine-stage counter. The display sequence begins counting with the clock once the inhibit has been removed, and sets a gate to prepare for the sequential readout of the null angle setting. After a count of four, a carry-out pulse from the nine-stage display sequencer loads the eight input line data from the angle display counter into the eight-stage parallel-to-serial counter. The nine-stage display sequencer will pause until the eight-stage binary-to-serial counter counts down to all zeros from its preset parallel jam eight bit input representing the angle. A carry-out pulse from the eight-stage parallel-to-serial counter steps the nine-stage display sequencer one count and also recycles to its maximum count and continues counting down to all zeros again. The system clock driving the eight-stage parallel-to-serial counter is divided by two while clocking three-cascade binary-to-decimal counters directly, to result in a binary step angle resolution of 2 degrees. The binary-to-decimal counters are counted up the same amount, but at twice the rate of the parallel-to-serial counter, until the carry-out pulse occurs at all zeros to inhibit the binary-to-decimal decoder from further counting. For the next three cycles of the eight-stage parallel-to-series counter, the nine-stage display sequencer is advanced three times to strobe the binary-to-decimal decoder first in units, then tens, then in hundreds of degrees. This strobing conserves the power consumed by the LED display. The strobing rate is fast enough that the display will appear to be continuous. An updated angle indication will be displayed as long as the operator maintain the DF mode. The operator can use amplitude indication, the receiver aural means, and the angle indicator simultaneously to determine the interferer's null position as the DF cardioid antenna pattern is rotated through 360 degrees. When leaving the DF mode, the nulling pattern must be re-established in manual, modem, or power leveling mode.

Advantages

Prior nulling devices gave no indication of null angle. Providing null indication permits pre-pointing nulls in the direction of previously known interference. Ability to determine null angle permits auxiliary use of nulling device as a direction finding unit. Use of binary to decimal conversion with display multiplexing as shown in FIG. 15 reduces power consumption.

Equivalents

The display sequencer, 8 stage binary counter and divide-by-two counter may be dispensed with by using a single ROM interposed between displays and the 8 stage angle display counter. To provide direct output over 360°, three bits would drive the units display, four bits would drive the tens display, and two bits the hundreds display requiring a ROM with nine bit output words. Should rhotheta phase shifters be used in lieu of delay lines and delay line VRC's, then drives to D1, D2, D3, and D4 would instead go to the theta phase shifters and the VRC1, 2 and 3 drives to the rho attenuators.

Figure 18:
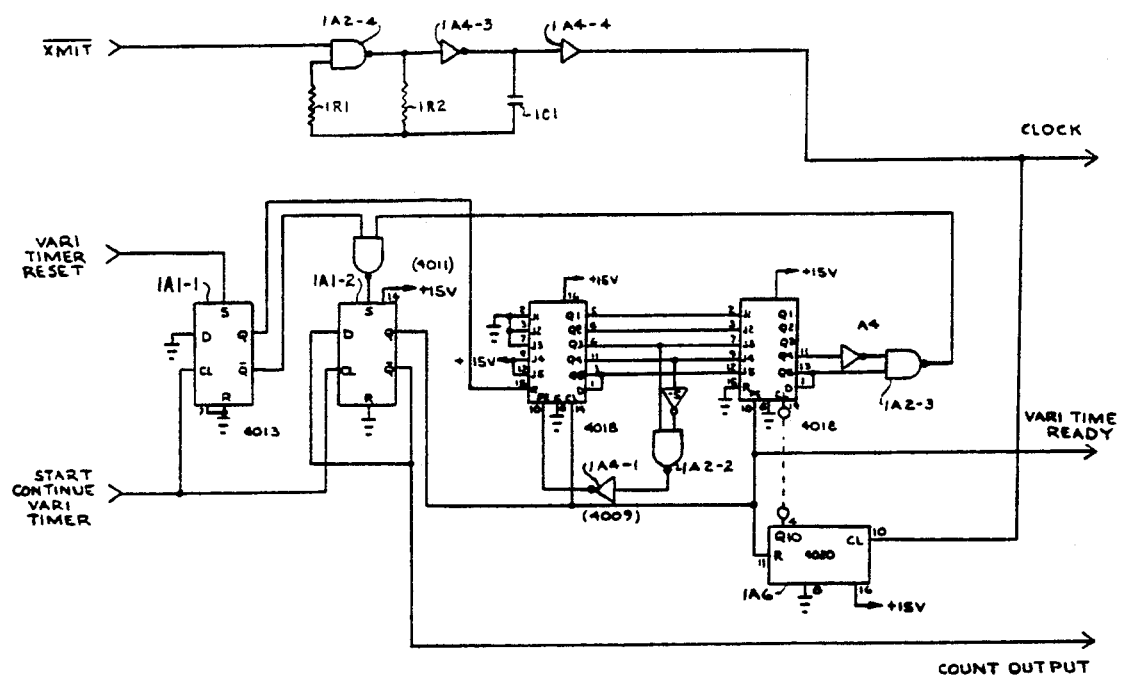
FIG. 18 is a schematic diagram of the RTSNAP I varitimer and clock circuit.

The varitimer and clock circuit is shown in FIG. 18. The system clock is part of two 2-input quad gates 1A2-4 and 1A4-3 and is configured as a free-running multivibrator circuit whose output pulse rate is determined by two resistors 1R1 and 1R2 and a capacitor 1C1. The system clock is inhibited during the RTSNAP I transmit mode, thereby inhibiting all manual or automatic logic controls. The system clock provides the basic timing for all manual and automatic sequences. The remaining circuitry is the varitimer circuit, which supplies the VRPC and delay clock signals in the manual mode. The rate at which the clock varies is determined by devices 1A1-1, 1A1-2 1A5 and 1A6, comprising a variable rate counter/divider circuit. The varitimer reset and start-continue pulses from the control processor are derived from initial turn on reset, the four-way joystick, and automatic mode operation as illustrated in the logic flow diagram, FIG. 10. Since an operator may decide to go from automatic cycle, the varitimer reset is required to initialize the timer for manual control.

Figure 19:
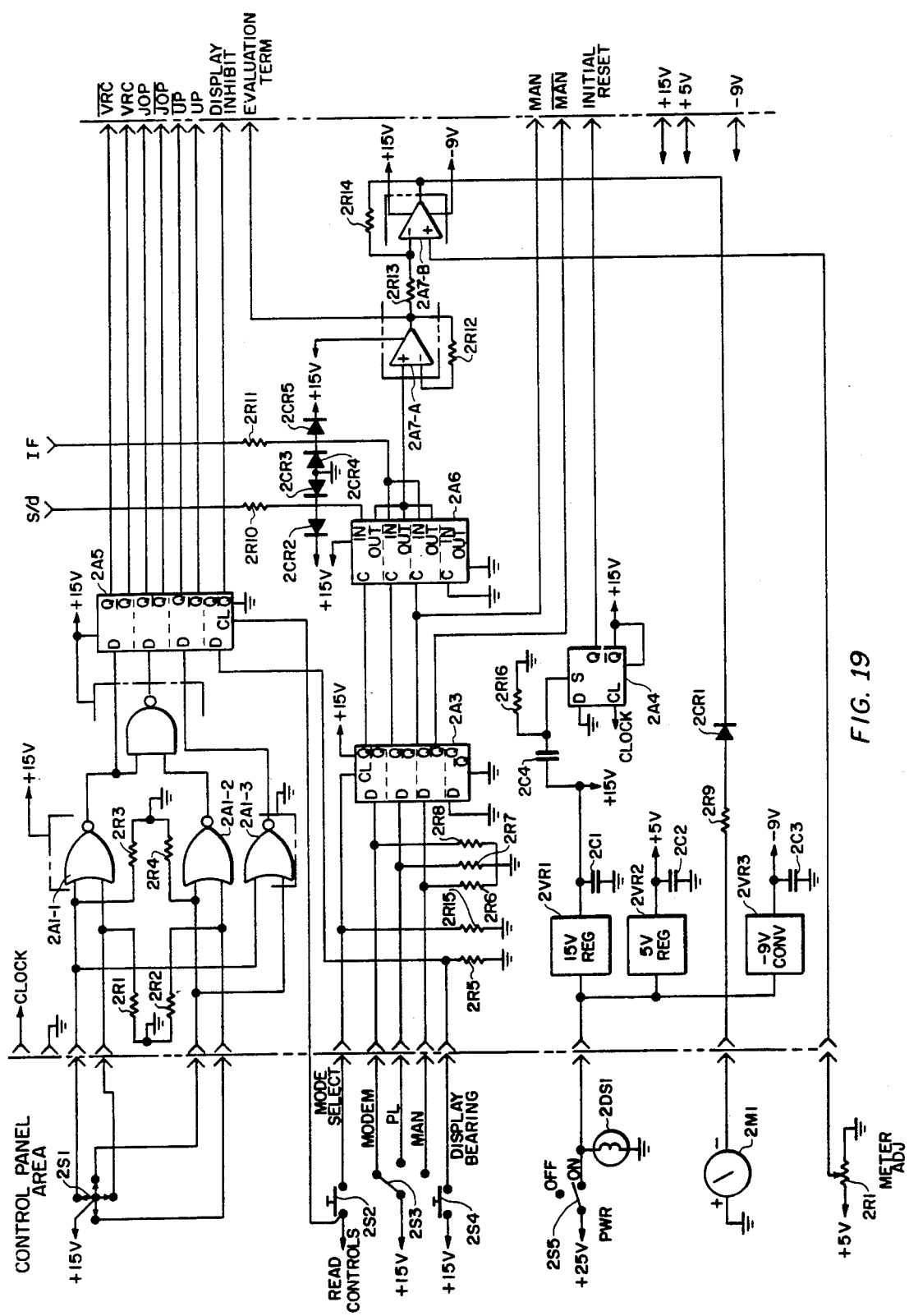
FIG. 19 is a schematic diagram of the RTSNAP I control, evaluation term and meter circuits.

The controls, evaluation term, and meter circuits provide the means for the interface between the operator, the companion receiver and the RTSNAP, as shown in FIG. 19. The primary power ON-OFF switch applies +24 Vdc to three voltage regulators. The voltage regulators are three-terminal devices in a TO-3 case, requiring no high current pass transistor. A rotary switch 2S3 selects the mode of control, which is not activated until the MODE SELECT pushbutton is pressed. In manual mode the Mode Select signal gates the four-way joystick control functions delay or VCR, increasing or decreasing through a gate 2A5 and also the selected control mode through a similar clocked gate 2A3. The selected mode of operation then gates a COSMOS analog switch to select the proper evaluation term analog voltage from either the S/I input from the companion receiver or the log IF input from the logarithmic amplifier 62. The Display Bearing command from a pushbutton 2S4 is also gated through a cocked gate 2A5. The Mode Select signal is generated by a timing sequencer in the central control processor, FIG. 20, and is called the Read Controls pulse. An operational amplifier 2A7-A (FIG. 19) in noninverting configuration acts as a buffer between the analog gate circuit 2A6 and the evaluation term sample and hold circuits in the sample timer circuits (FIG. 21) and the log metering circuits. The meter 2M1 display's 40 dB scale range is determined by the gain of an operational amplifier 2A7-B and its feedback resistors 2R13 and 2R14. This 40 dB full scale deflection can be adjusted over the total received signal dynamic range by a front panel 2R1, METER ADJUST. With initial primary power ON, capacitor 2C4, resistor 2R16 and set/reset flip-flop 2A4 generate an initial reset pulse to reset all counters. The analog gate 2A6 is protected from over voltage on reverse voltage from the S/I and log IF inputs. Diode 2CR1 protects the front panel meter from a reverse voltage.

Figure 20:
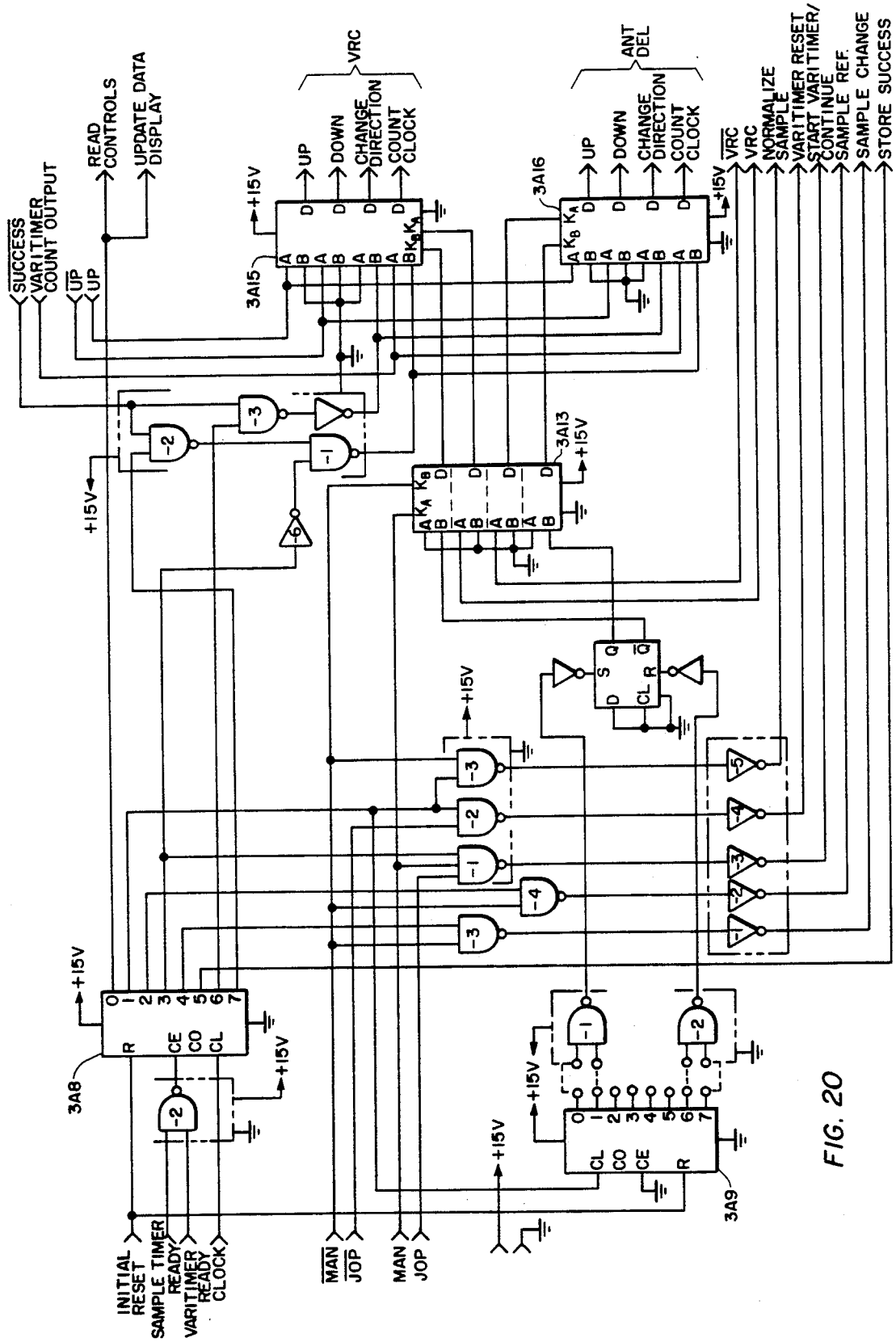
FIG. 20 is a schematic diagram of RTSNAP I control processor.

The central control processor, FIG. 20, routes the manual or automatic control commands to control the VRPC and antenna delay even bit delay lines DL1-DL4 in incremental binary steps in the proper timing sequence and direction. Input manual and joystick operated signal functions from the controls circuits, FIG. 19 initiate the Varitimer (FIG. 18) Start, Reset, and Continue Logic signals. A sequencer 3A8 clocked by the system clock, controls the sequence of the read controls to the control circuits, FIG. 19; varitimer resets, FIG. 18; normalized sample and store circuits, FIG. 21 and the display update signal in the angle display circuits FIGS. 24 and 24A. Manual control signal functions (FIG. 20) are gated through all the A inputs of the and-or gate 3A13 by its KA clock bus signal. Automatic signal control functions are clocked through the B input lines of gate 3A13 when the KB clock bus is activated by an automated mode selection. Similar and-or select gates 3A15 and 3A16 are selected or either VRPC or antenna delay line control by the two complementary VRPC control lines from the controls circuit, (FIG. 19) in either manual or automatic control modes. The direction clock, and success evaluation term to change direction are gated through the selected VRPC 3A15 or 3A16 gate. Binary counter 3A9 controls the sequence of events through an automatic control loop cycle, and changes the function selection of VRPC or delay line control.

The binary counter and drive circuits for the antenna delay lines DL1 (FIG. 22) and DL2 (FIG. 22A) and the VRPC variable ratio power combiner DL3 (FIG. 23) and DL4 (not shown in detail) are part of the control processor logic. See my patent application Ser. No. 180554 filed Aug. 25, 1980 for the description of a typical binary switched delay line, which is incorporated by reference For illustration purposes, the RF delay lines are shown as part of the circuit in FIGS. 22, 22A and 23, but they are actually configured as separate RF stripline modules separate from the logic drive circuits. A typical delay bit segment consists of D1, the OFF path; D2, the delay line ON path; diodes CR1 to CR4, the SPDT PIN diode switch; chokes L1 and L2, input bias line RF chokes; and RF decoupling capacitors C1 to C5.

Figure 22:
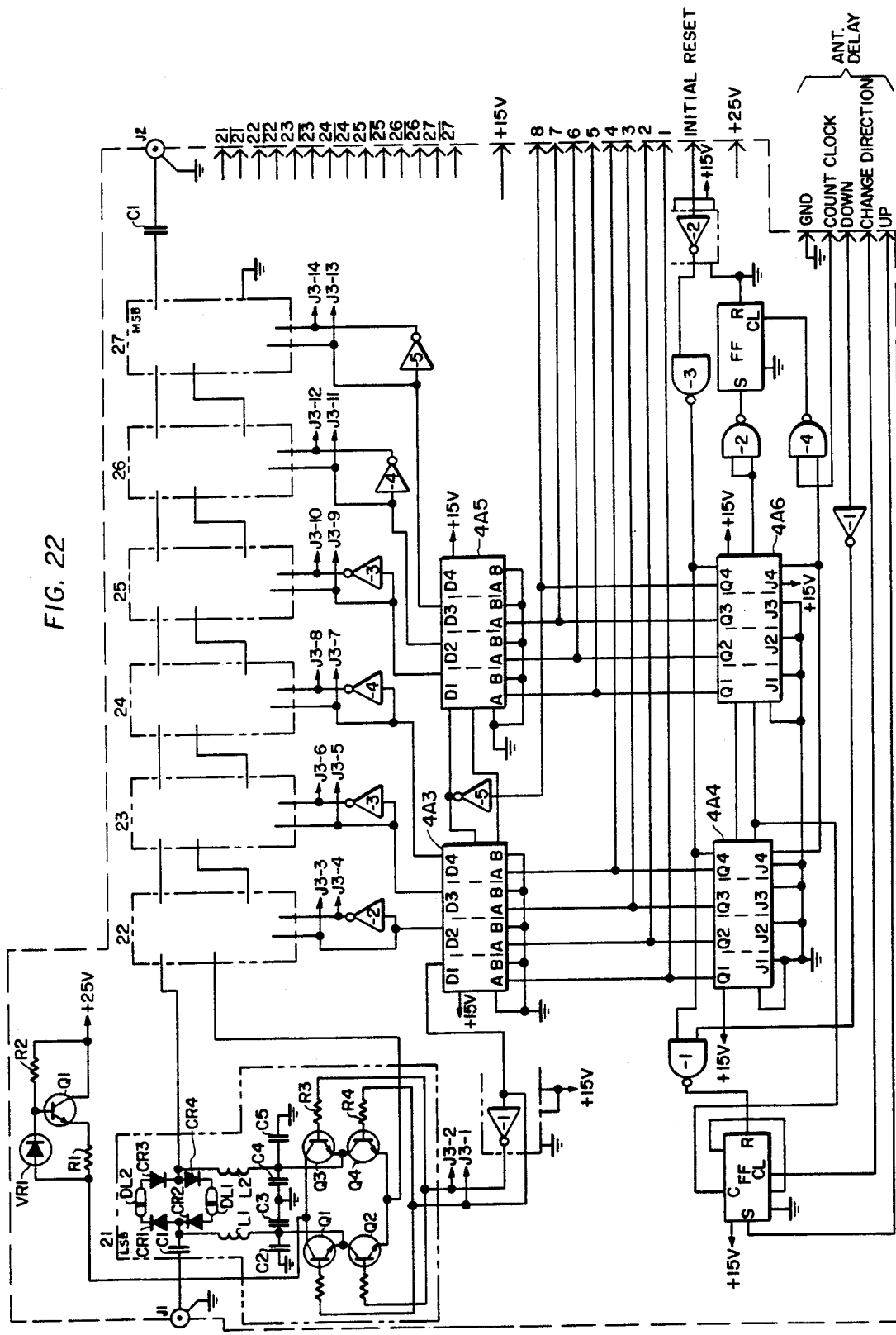
FIG. 22 and 22A are schematic and block diagrams of the RTSNAP I Antenna delay lines.
Figure 22A:
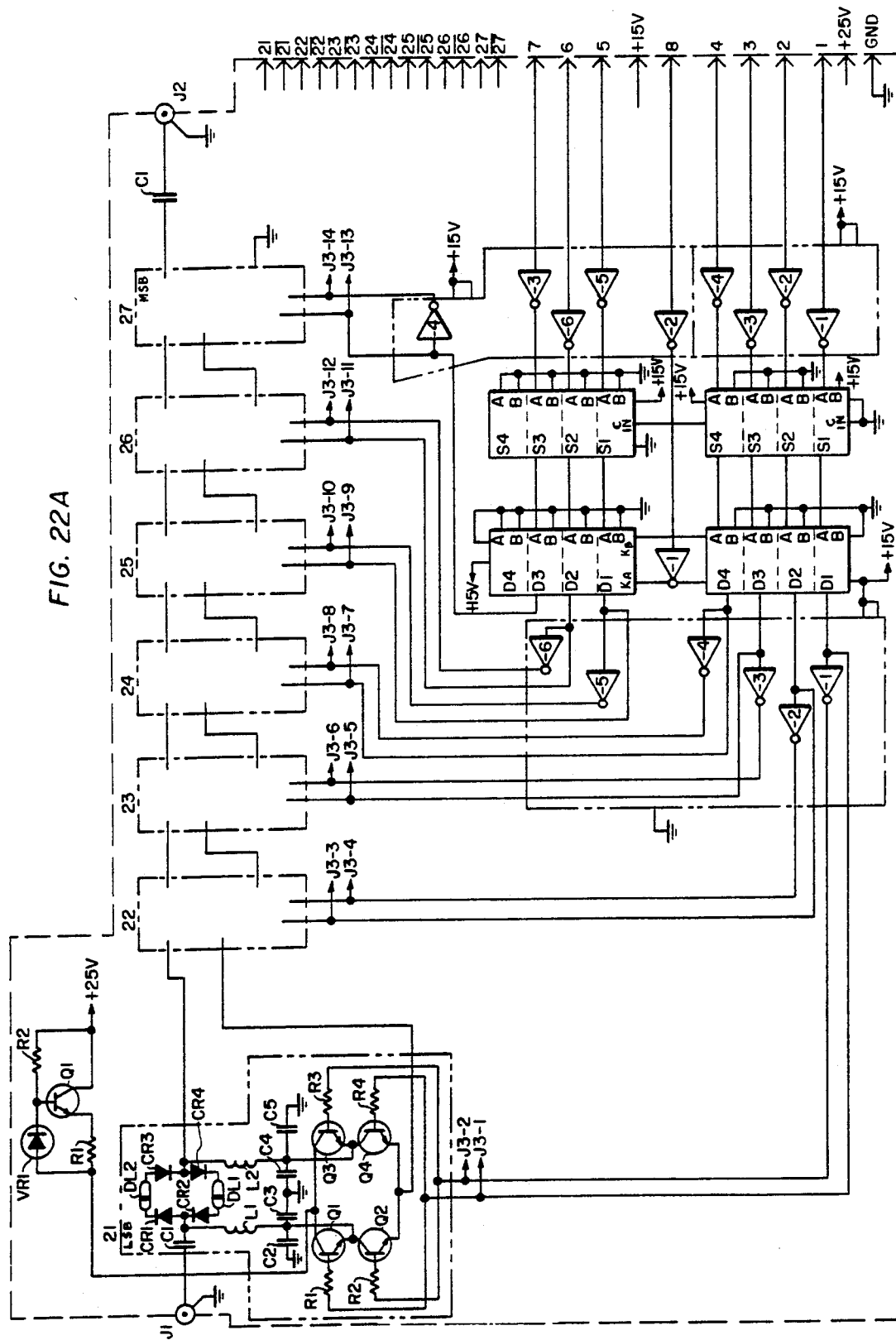
Figure 23:
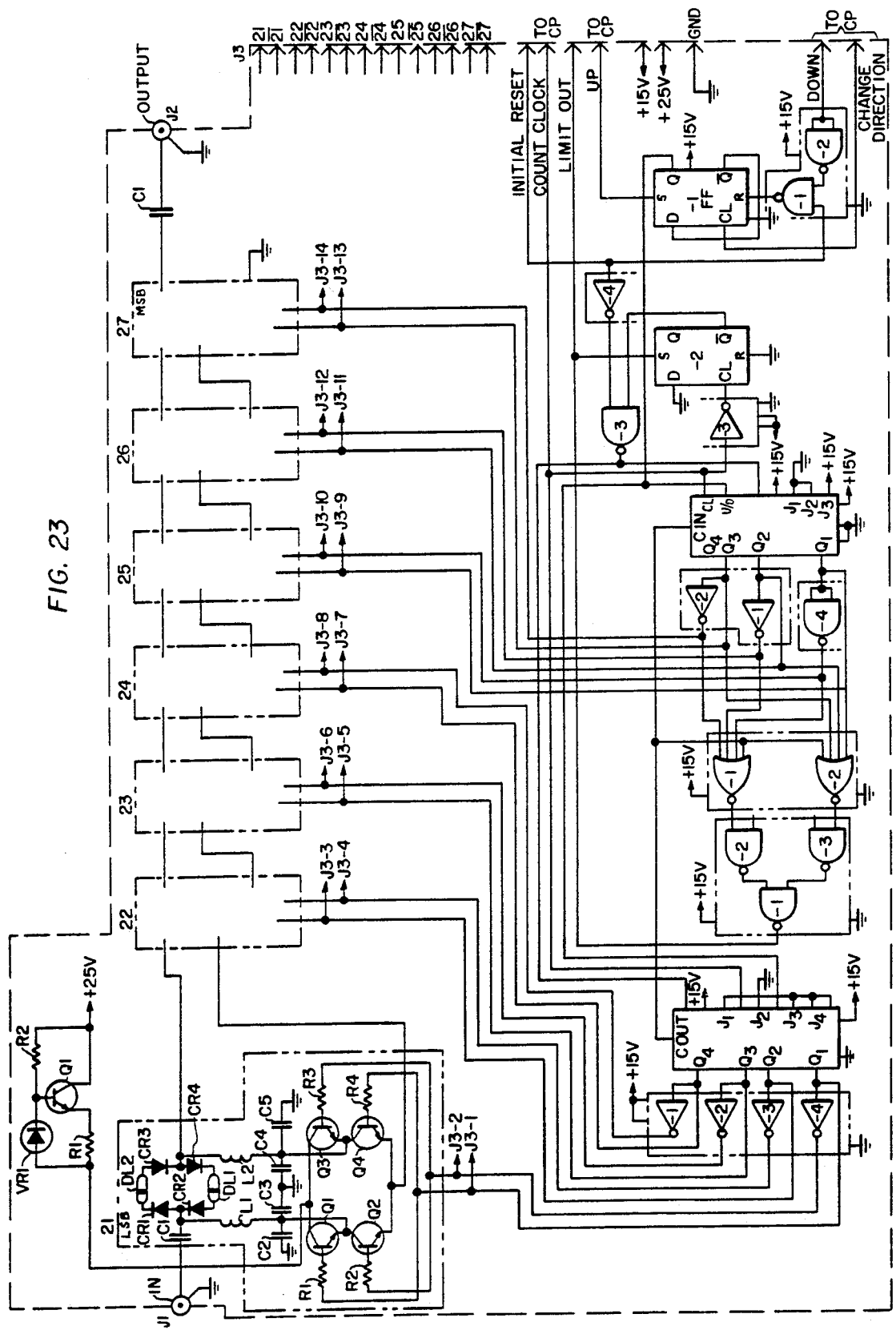
FIG. 23 is a schematic and block diagram of one RTSNAP I VRC delay line.

The delay line input control signals, FIG. 22, come from the antenna delay select gate, FIG. 20 and consist of an initial reset, count clock, up, down and change/control, an eight-stage up-down counter 4A4 and 4A6 that provides a binary seven-bit code to drive both antenna' seven bit delay lines DL1 and DL2 and a parallel eight-bit code to the angle indicator circuit 60. The eight-stage binary up-down counter controls the two antenna delay lines in a differential fashion. For instance, delay line DL1 is controlled over 128 incremental steps while delay lines DL2 is fixed at its minimum delay setting. Likewise, while delay line DL2 is controlled over 128 incremental delay steps, delay line DL1 is set to its minimum delay setting for a total differential delay of 256 incremental steps and the required eight-bit code for antenna angle position. The AND-OR select gates select delay line DL1 (FIG. 22) or delay line DL2 (FIG. 22A) for control. The seven-bit output from the AND-OR select gates 4A3 and 4A5 is inverted to provide a complementary input to the transistor drive circuits.

As an example of the differential transistor drive circuit, FIG. 22, assume J3-1, the A input line to transistors Q1 and Q4, is high. Transistors Q1 and Q4 are switches, and are driven from a constant current source, Q5 and VR1. When the A input line goes high, transistors Q1 and Q4 turn ON and Q2 and Q3 are turned OFF. The constant current PIN diode bias current flows from the emitter Q1 through PIN diodes CR1 and CR3, then through the other ON transistor Q4, repeating this circuit path through the other ON transistors in the remaining six delay line bits. Transistors Q2 and Q3 bias PIN diodes CR2 and CR4 OFF. When the input logic line A and A switch polarity, the transistor drives and delay lines are switched. The single constant current driven Q5 and VR1, provides a common constant current bias of 50 MA to the 14 ON PIN diodes in the seven-bit delay line. This common bias drive current conserves considerable power over the method of providing separate 50 A drive to each individual delay bit. The seven-bit output from the up-down counter 4A4 and 4A6 is applied to the antenna delay line DL2 circuit, FIG. 22A, to control the seven-bit delay line in a similar fashion. The two antenna delay lines are always driven to minimize the differential delay between the two antenna elements, using the minimum length delay bits to avoid the longer delays for over octave bandwidth operation.

The circuit operation of the VRPC's two delay line controlling elements DL3 (FIG. 23) and DL4 is very similar to the antenna delay line. The VRPC seven-bit RF stripline PIN diode switched delay lines are identical to the antenna delay lines along with the differential transistor push-pull drive circuit and constant current source. The two seven-bit delay lines required for VRPC control, however, are driven in equal and opposite 128 incremental steps, to keep the output differential phase constant between the two VRPC antenna output ports. The input control lines to the VRPC counter and drive circuit (FIG. 23) are Initial Reset, Clock, Up, Down, and Change of Direction from the control processor AND-OR select gate (FIG. 20). These input lines control the VRPC eight-stage binary up-down presettable counter which provides a seven-bit output to drive both seven-bit delay lines. The seven-bit output from the up-down counter is inverted to provide a complementary seven-bit control to the differential transistor PIN diode switch drivers. The SPDT PN diode switch operation is similar to that described in the antenna delay line. The eight-stage up-down counter circuit consists of recycle logic to limit the count to the required seven-stages, and also a limit count detection circuit to cause a halt or reversal in counter direction if it reaches its limit of all zeros or all ones. The VRPC control delay line DL4 (is shown in detail) is driven directly from the complement of the VRPC delay line DL3 (FIG. 23) seven-bit control.

Figure 21:
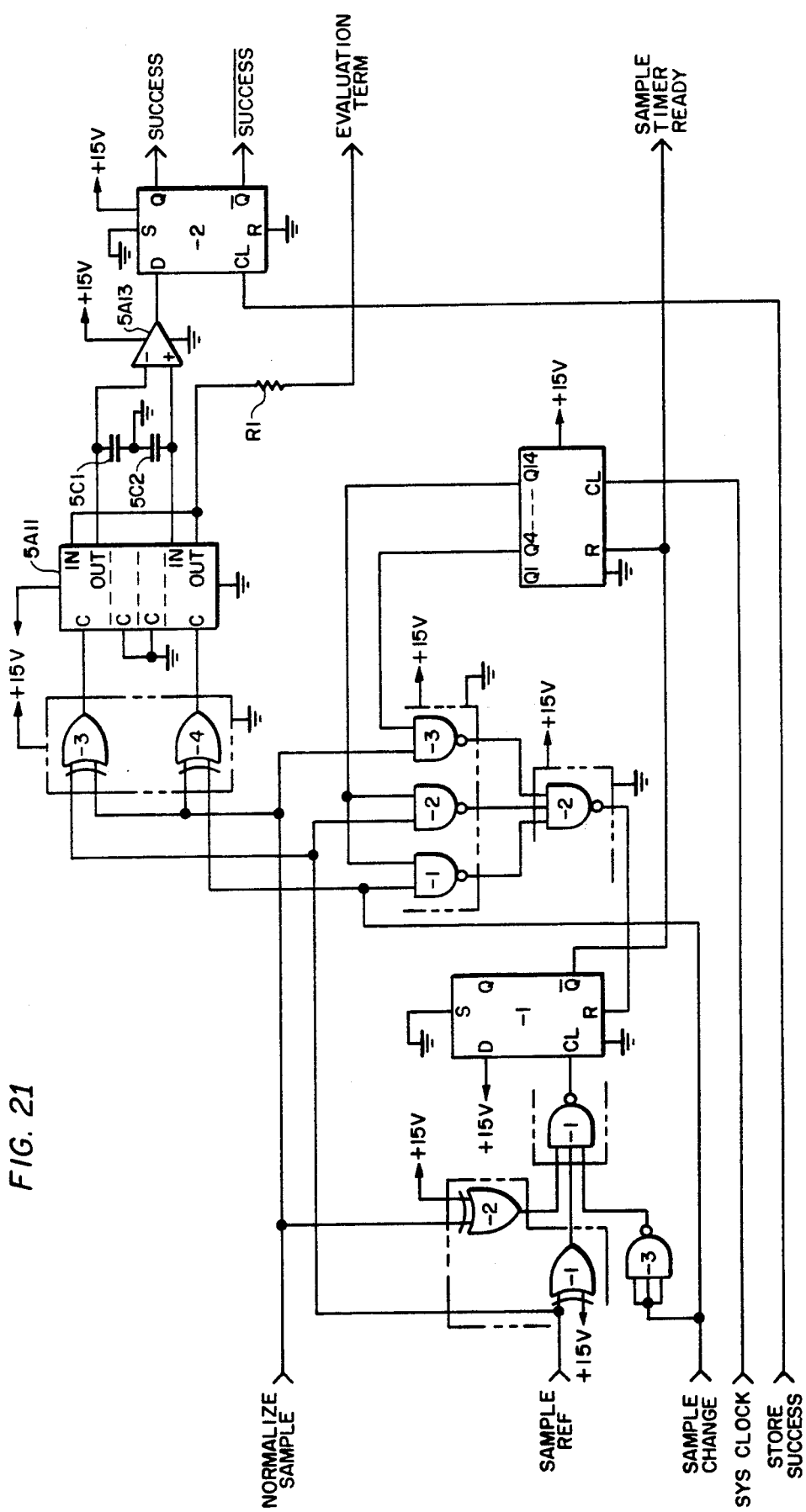
FIG. 21 is a schematic diagram of the RTSNAP I sample timer.

The function of the sample timer circuits 56, FIG. 21 is to sample the evaluation term, which is a measure of the received S/I ratio, compare it against the last reference sample, measure the differential sample change, and determine the direction of change for improvement or no improvement of S/I. The heuristic logic flow as described in FIG. 10 then maximizes the S/L evaluation term. As shown in step (1) of the automatic control loop of FIG. 10, a normalized sample pulse first normalizes the voltage across two capacitors 5C1 and 5C2 by shorting them together through an analog gate 5A11. Then a new sample of the evaluation term charges one storage capacitor 5C1 as the reference sample. The function being controlled, VRPC or antenna delay, is then stepped one increment and the analog evaluation term representing this new received signal charges the other capacitor 5C2 through the analog gate 5A11. The sample change is compared with a comparator amplifier 5A13 to determine if the incremental change resulted in improvement or not of the received S/I ratio. The system clock and sample sequencer from the control processor provide the basic timing for the compare circuits. These circuits function in the automatic mode only.

The angle indicator control circuits 60 continually read the latest antenna delay line eight-stage counter output, which represents the null angle, and converts the digital output to a decimal three-digit LED readout upon operator command.

Since RTSNAP I uses delay instead of phase shift, no respacing of the antenna elements is required as a function of frequency. However, the elements must be sufficiently closely spaced (not more than $\lambda/2$) at the highest frequency to avoid unwanted additional pattern nulls. Digital read-only memories can be programmed to organize the antenna element delay counter in incremental delay steps, and angle indication of 180 degrees in 256 incremental steps, to the digital angle indicator display. The approach is shown in simplified form in FIG. 11 for the two-antenna-element case. The transmit and receive antenna patterns are identical and are symmetrical about the line passing through the phase centers of the two antenna elements. Thus, a null produced on one side of the line has a mirror image of the other side, and as the first null is varied in position, the second null also varies. If the line through the elements is made the null angle reference, and the null along the line directed out from element 1 is taken as the 0 degree reference, then the angles of both nulls can be identified by one indicator because of the symmetry involved. Thus 0 degrees specifies a null (only one will exist because of the convergence) directed out the number 1 element end of the array (end fire), 90 degrees specifies two nulls that are broadside, and 180 degrees specifies a single null out the number 2 element end of the array. The general scheme is shown in FIG. 12. Since no information is available as to which null the interference is in (without introducing additional complexity), no determination is made as to whether the jammer is at $+\alpha$ or $-\alpha$. For each null angle 2, only one phase setting of the vector multiplier exists if the above spacing of antennas 1 and 2 is less than $\lambda/2$.

Figure 24:
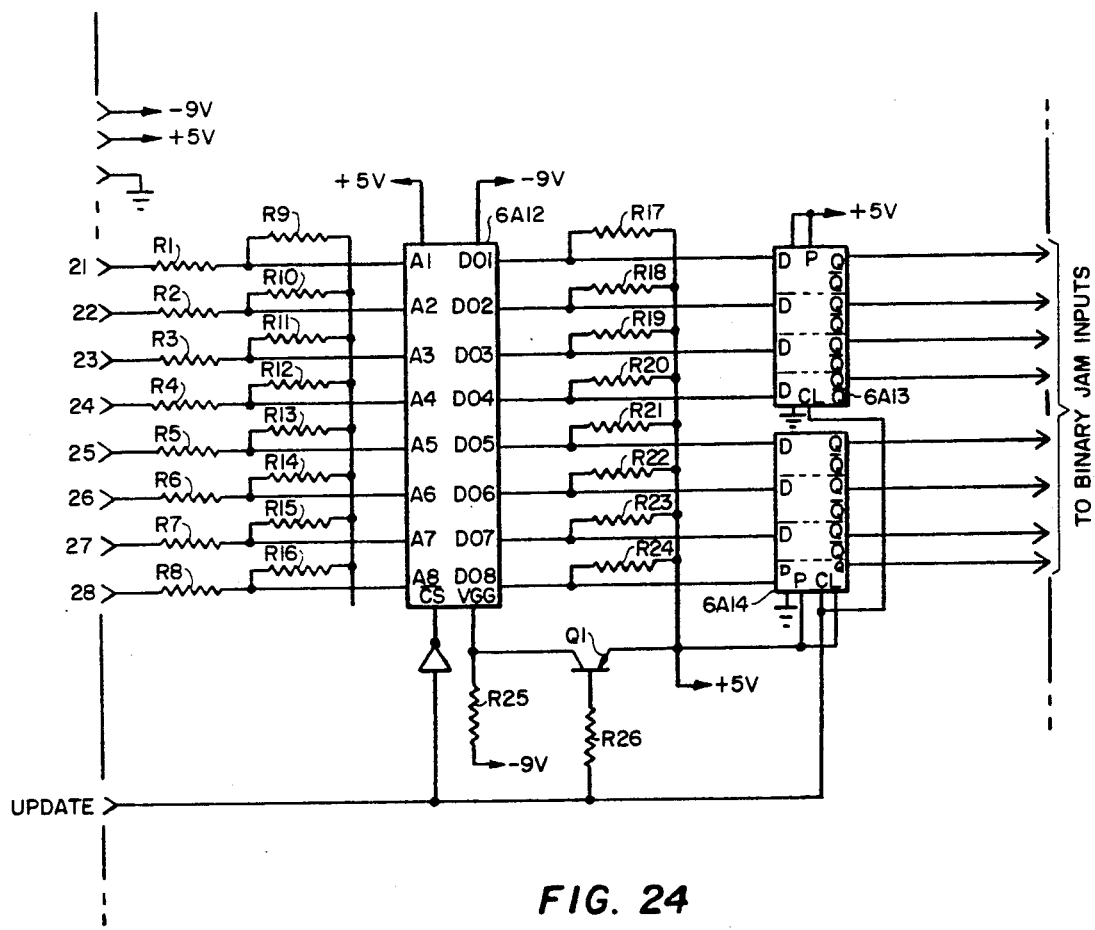
FIG. 24 is a schematic diagram of the RTSNAP I angle display ROM circuit.
Figure 24A:
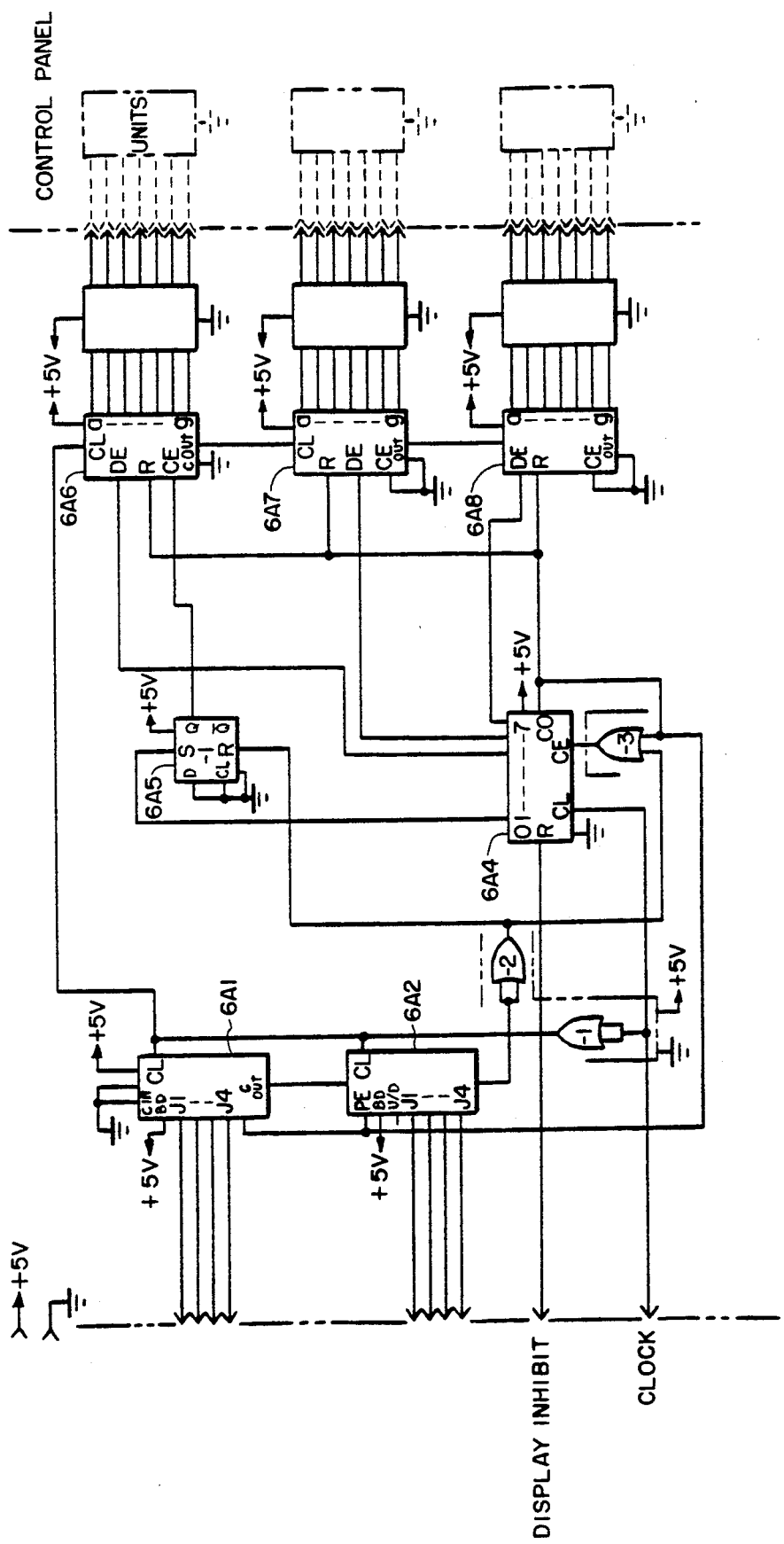
FIG. 24A is a schematic diagram of the RTSNAP I angle display binary to decimal converter circuits.

The angle indicator display circuits 60, FIG. 24, receive the eight-bit word representing the null angle position from the antenna delay line eight-stage up-down counter (FIG. 22). This parallel eight-line input is clocked into the read only memory by an Update pulse from the control processor timing sequencer (FIG. 20). The read only memory has been preprogrammed to read out an eight-digit word representing angles of +180 degree in 256 incremental steps. The read only memory is a 256 word by eight-bit electronically programmable memory with a required supply voltage of +5 and 9 Vdc. The resulting eight-bit word output from the ROM is also gated through a clocked latch 6A13 and 6A14 by the Update pulse. The Update pulse strobes the ROM and its output latch to store the last phase angle setting, to conserve power by using the ROM only when needed. The latch storage gate is CMOS and consumes very little power. The eight-bit output from the gated latch is then applied to the jam inputs of an eight-stage up-down counter 6A1 and 6A2 (FIG. 24A). The counter is always forced to count down. When the operator presses the front panel BEARING DISPLAY a display inhibit pulse is removed from a display sequencer seven-stage counter 6A4. The display sequencer 6A4 begins counting with the clock once the inhibit has been removed, and sets a gate 6A5 to prepare for the sequential readout of the null angle setting. After a count of four, a Carry Out pulse from the seven-stage display sequencer 6A4 jams the eight input lines from the ROM's storage latch into an eight-stage parallel-to-series counter 6A1 and 6A2.

The seven-stage display sequencer 6A4 will pause until the eight-stage binary-to-series counter counts down to all zeros from its preset jam input representing the angle. A carry-out pulse from the eight-stage parallel-to-series counter 6A2 steps the seven-stage display sequencer one count and then counter 6A1 and 6A2 recycles to its maximum count and counts down again to all zeros. As the eight-stage parallel-to-series counter 6A1 and 6A2 counts down to zero, the clock also counts the three cascade binary-to-decimal counters 6A6, 6A7 and 6A8 up by the same count, until the Carry Out pulse occurs at all zeros, and then inhibits the binary-to-decimal decoder from further counting. For the next three recycles of the eight-stage parallel-to-series counter 6A1 and 6A2 the seven-stage display sequencer 6A4 is advanced three times to strobe the binary-to-decimal decoder 6A6, 6A7 and 6A8 first in units, then tens, then in hundreds of degrees. This strobing conserves power consumed by the LED display, and it is at a fast enough rate that the display appears to be continuous. An updated angle indication will be displayed as long as the operator presses the BEARING DISPLAY front panel pushbutton.

RTSNAP II

The RTSNAP II unit interfaces between four center-fed vertical antennas and the RF input of tactical transceivers. It permits rapid manual and automatic nulling of undesired signals over a wide dynamic range, in both the received and transmit modes, for all signal azimuths. FIGS. 6–8 illustrate the RTSNAP II system configuration. From this illustration it can be seen that the RTSNAP II RF circuit configuration consists of two RTSNAP I circuits combined through a common variable ratio power combiner (VRPC), with the delay line bit lengths and hybrid couplers scaled to the higher 225 to 400 MHz frequency range. Similar to RTSNAP I, six major subsystems make up the overall system:
1 Antennas
2 Delay line phase shifters
3 Variable power dividers
4 Null angle indicator
5 Null depth indicator
6 Digital controller and operator controls.

The RTSNAP II interfaces with the external environment through a four-element array. The four-port null combiner has the capability of adjusting the power level and phase of each antenna element to point a null in the azimuthal direction of one or more simultaneous undesired signal interferers.

The vector multiplier, which includes the antenna delay line phase shifter and VRPC, interfaces directly with the four RTSNAP II antenna ports. Each antenna element vector multiplier offers reciprocal receive-transmit operation at a 40-watt level, with low insertion loss. The antenna phase shifter switched delay line and VRPC is similar in design to RTSNAP I, with the binary delay elements scaled to shorter lengths and the hybrid combiners of the VRPC changed to accommodate the increased operating frequency. The same antenna switched delay line RF design is also used as the amplitude control device in the VRPC. The two switched delay lines in each VRPC are varied in equal and opposite increments to produce a variable amplitude with constant phase differential output characteristic. The output differential amplitude can be varied over a range greater than 30 dB. PIN diode SPDT solid-state switches are used to switch the transmission line delay elements in a seven-bit binary ladder. The seven-bit delay lines in each of the four antenna elements and the two VRPCs are identical, and are constructed using stripline techniques. It is desirable to construct the ten seven-bit delay lines in a RTSNAP II system as identical modules, in order to simplify construction and testing procedures. The RF system component configuration is therefore very simple, being composed of combinations of seven-bit delay lines and hybrid junctions. The seven-bit delay lines in RTSNAP II function similarly to those in RTSNAP I, with each phase shifter delay line controlled by a seven-stage up-down phase counter in 128 incremental steps, for a total differential delay adjustment capability of 256 incremental steps between any two antenna elements. The two delay lines in each variable ratio combiner are driven simultaneously in 128 incremental equal and opposite steps.

The seven-bit delay line bit elements vary from $\lambda/4$ to $\lambda/256$ in a binary fashion, and their physical lengths are cut for the RTSNAP II geometric mean frequency of 300 MHz, for a dielectric material constant of 2.54. The PIN diode has typical turn on and off times 200 nanoseconds.

FIG. 8 illustrates the RTSNAP II control processor and its peripheral logic control and monitoring functions. CMOS logic elements are used throughout, except for the high current drive circuits, to conserve power. Three regulated supply voltages are required: $+15$ Vdc $+5$ Vdc and $-9$ Vdc. A 9 volt dc to dc converter is used, requiring only a single $+25$ Vdc primary supply to the RTSNAP II modem.

A completely digital design approach is used, using a sample and hold circuit to sample the evaluation term, and an analog-to-digital converter (ADC) to convert this sample of the received signal level to a 12-bit binary word. Successive samples are compared digitally by a heuristic process as a measure of improvement in the received signal environment, and as a means of controlling the antenna array pattern nulls to continue the search for constant improvement. Since the seven-bit delay lines can be directly driven by logic signals, no digital-to-analog converters are required. High beta transistor switches are used to drive the DPDT PIN diode switch bias network directly, similar to RTSNAP I. As in RTSNAP I, the two delay lines in each VRPC are driven differentially in equal and opposite delay steps. The three VRPCs are controlled as separate amplitude control devices, to proportion each antenna element's receive or transmit power to the proper level Seven-stage up/down counters mounted on one of the delay line stripline module pairs drive the PIN diode switches' transistor drivers, to control the delay line in 128 increasing or decreasing incremental delay steps in each antenna element. An amplitude control seven-stage up/down counter will likewise control the two delay lines in each VRPC in opposite delay directions and in 128 equal delay step increments.

The system clock, which includes a common manual and automatic control sequencer, provides the basic timing for the control logic circuits. The varitimer circuit is used in the manual and DF control modes. In the manual mode, when the operator first presses the four-way function control joystick to either Amplitude or Delay, Increasing or Decreasing, the varitimer reduces the basic clock timing pulses to the VRPC and antenna delay lines to a very slow rate. As the operator continues to press the function switch, the varitimer output clock rate increases. This allows the operator a variable rate of control, slow when in deep nulls to change one delay increment at a time, and fast when trying to achieve a rapid approximation of the null before final sensitive deep null adjustment.

The operator can select four RTSNAP II control modes; manual, auto modem, auto power leveling PL), or direction finding (DF). The operator simply switches the front panel Mode Select switch to MODEM or PL in a RTSNAP receive mode, and the unit will automatically null interferers). An automatic sequencer steps through a logic sequence changing first delay, then amplitude differential between antenna element pairs and their respective VRPCs in such a direction as to improve the received signal-to-interference (S/I) ratio. The S/L analog voltage term is derived in the companion receiver, and is applied to the RTSNAP II as the evaluation term in the automatic modem control mode.

T evaluation S/I term is then applied to a sample-and-hold circuit whose sampled level is converted to a 12 bit digital word by an analog-to-digital converter.

Successive digital samples are compared digitally to derive a digital difference term that indicated improvement or not over the last sample of the received signal environment. Control logic is designated to optimize this term for constant improvement. The 12 bit binary word representing the sample of the received level is also applied to the amplitude display circuit and converted to the decimal equivalent of the received energy level in dB, over the total dynamic range of input received energy. This amplitude display circuit is actuated by a front panel DISPLAY switch, and can be used to indicate the optimization term performance in any of the four RTSNAP II control modes.

An automatic power leveling mode is included to automatically null the largest receive signals. An IF input (before limiting) from the companion receiver is required to derive the evaluation term for the PL control mode. This IF voltage is amplified by a wide dynamic range logarithmic amplifier in the RTSNAP II to provide an analog video evaluation term to the same sample and hold and ADC circuit used in the automatic modem nulling mode. The logarithmic amplifier can provide over 100 dB amplitude meter adjust as required.

In the manual control mode the operator controls the amplitude and delay of each antenna element by means of a four-way function control joystick switch and an Antenna Advance pushbutton. By means of the receiver aural output and observation of the front panel null amplitude LED display, the operator adjusts the four-way function switch and Antenna Advance until the interferer signals are nulled.

To determine an interferer's location, the RTSNAP II is switched to the DF mode. In this mode a fixed cardioid antenna pattern is generated and rotated in phase through 360 degrees by the operator's left-right motion of the four-way joystick, to position the cardioid null in the direction of the interferer(s). The null angle indication can be stepped in 2 degree increments to each interferer in succession. The operator can use aural detection means and the RTSNAP' I amplitude display to determine the interference null. Null angle is displayed continuously in the DF mode to 360 degrees. When leaving the DF mode the null pattern is reestablished.

The RTSNAP II transmit mode can function in any control mode. The system sequencer is inhibited during the transmit mode with the transmit antenna array pattern being that of the last pattern achieved in the receive mode.

The power supplied to the RTSNAP II unit is +25 Vdc vehicular battery supply. The RTSNAP logic, analog, and RF circuits +15 Vdc, +5 Vdc and −9 Vdc regulated voltages. The −9 Vdc is derived from a dc to dc converter to simplify primary battery power requirements. The COSMOS logic works from +15 Vdc, while the special memory circuit logic in the angle and amplitude indicator circuits require +5 Vdc and −9 Vdc. The logarithmic amplifier hybrid modules are also supplied by the regulated +5 Vdc bus.

The RTSNAP II control and monitor functional block diagram is shown in FIG. 8. The basic circuit functions are:

1 Clock and varitimer
2 Control processor
3 Sample timer
4 controls and power circuits
5 Evaluation term and ADC circuits
6 DF storage and digital display circuits.

By use of the front panel controls, an operator can select four modes of RTSNAP II control: manual, power leveling (PL), auto modem, and direction finding DF). The control processor and related logic circuits provide digital control to adjust the differential delay and amplitude of input signals between four antenna elements to achieve a null in the direction of one or more interferers. The system clock provides basic time pulses for the manual and automatic logic sequences. The varitimer is used only in the manual and DF control modes, and is a variable rate clock that varies, as the operator presses the four-way joystick, to control the rate of change of the delay line or VRPC incremental control. The control processor contains the basic central logic for the manual, automatic, and DF control modes. The sample timer provides the sample pulses for the evaluation term sample and hold circuit prior to analog-to-digital conversion. It also contains the binary comparator that determines the relative improvement of successive evaluation term samples. The evaluation term and ADC circuit contain a select gate for either of two evaluation terms from the companion receiver; an S/I correlation term, or a log video input from the RTSNAP logarithmic LF amplifier. The analog evaluation term is then applied to a sample and hold circuit whose analog sample is converted to a 12 bit binary word by an ADC. The DF storage circuits contain the antenna delay line and VRPC memories to generate a fixed cardioid antenna pattern in the DF mode. Two identical digital display circuits convert the amplitude 12 bit binary word to a four digit LED decimal readout, and the null angle eight bit binary word to a three digit LED decimal readout. The controls and power circuits provide an interface between the front panel manual and automatic controls and the central processor.

Figure 13:
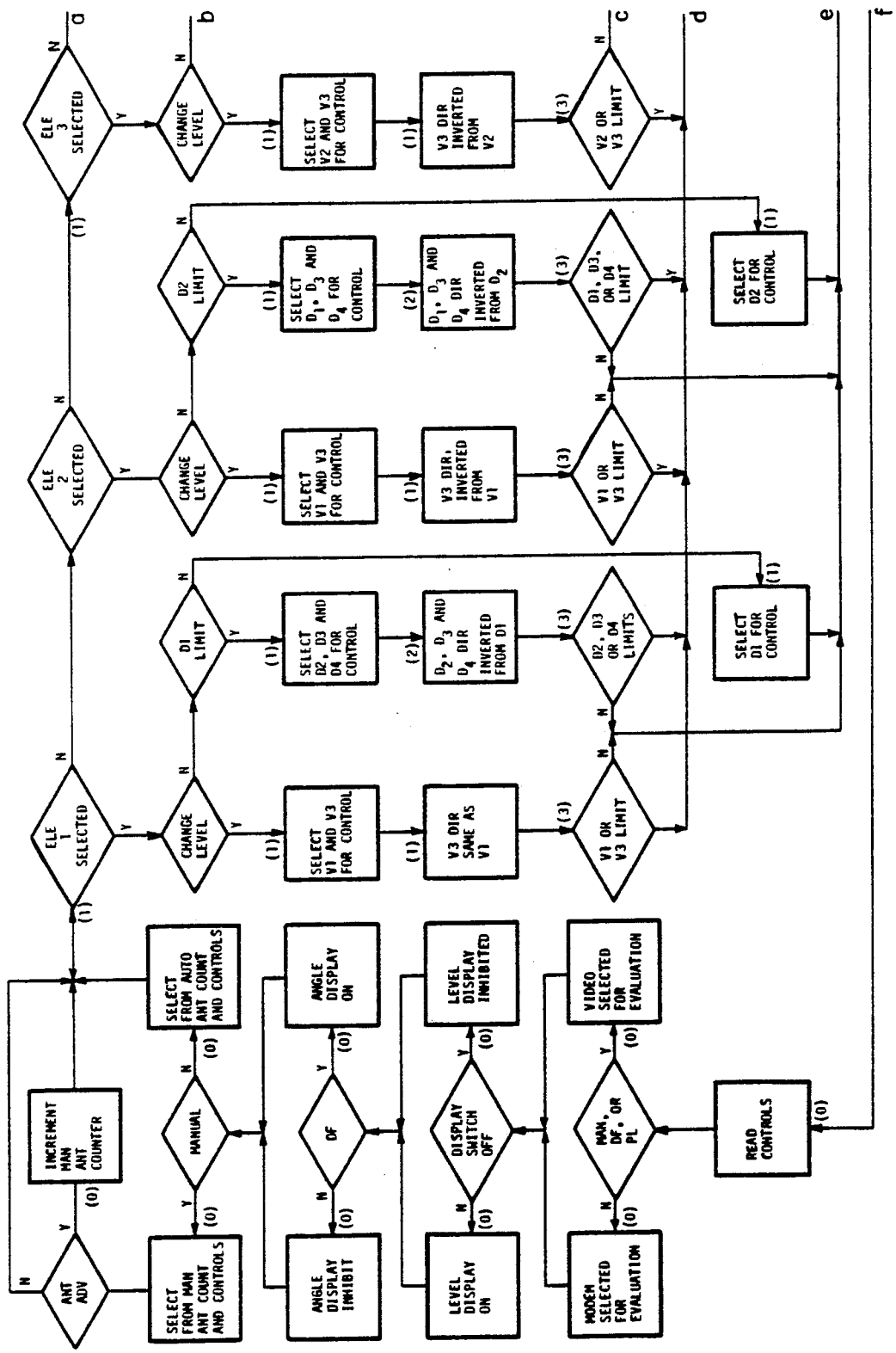
FIGS. 13 and 13A comprise a RTSNAP II process flow diagram.
Figure 13A:
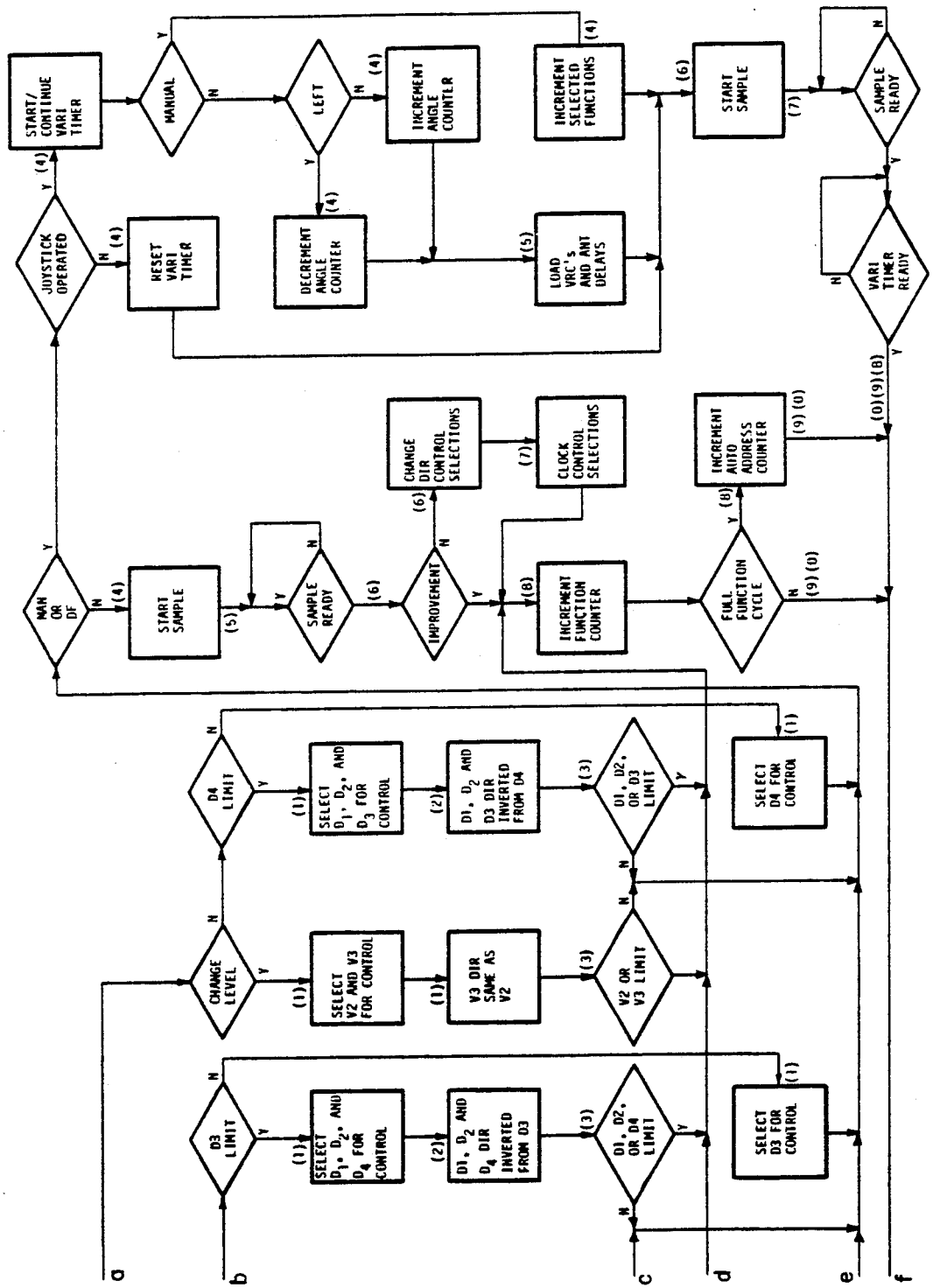

FIGS. 13 and 13A (hereinafter referred to as FIG. 13 illustrate the basic control functions necessary to achieve signal nulling, power leveling, or locating the direction of an interferer. The logic events are numbered time sequentially on the process flow diagram. With initial power turn on, the Read Controls at time T=(0) reset all timing logic and sequencers to an initial state. The operator rotates the Mode Select four way rotary switch to the mode of operation he desires. The Read Control logic selects the proper evaluation term for the chosen mode of operation: S/I for modem, or video for manual, PC, or DF. The Read Control Logic also controls operation of the amplitude and DF angle display, the manual or automatic control, and the antenna advance. The logic positions of these controls are d by the selected mode. At time T(1), for any of the four control modes, if antenna element 1 is not selected, the logic skips to element 2, and so on. The process is identical for elements. Element 1 selection is assumed for explanation. If the function is VRPC control, the level is prepared for change. VRC1 and VRC3, FIG. 8, are changed equally and in the same direction. If VRC1 and VRC3 are in limit at T3, the logic sequence steps to T8, where the function is changed to delay line control. When not in limit, manual, DF, or automatic modes are determined. If in automatic, modem, or power leveling, at T(4) the evaluation term is sampled by the sample and hold circuit, and stored as a reference sample after analog-to-digital conversion to a 12 bit binary word. Back at time T(1), if digital conversion to a 12 bit binary word. Back at time T(1), if the function had been delay line control, delay line D1 would be checked for a limit. If no limit, then D1 is selected for control and the process loop continues to the manual, DF, or automatic control check similar to the VRPC loop above. With delay line D1 in limit, delay lines D2, D3, and D4 can all be controlled in the opposite delay direction to D1 for the same results. All three delay lines must be checked for a limit also at T(3). If any one is in limit, the process flow continues at T(8) to change function to VRPC control.

Once the proper element controls have been selected, with no limit problem, manual, or DF mode is determined at T(4). If in manual or DF, joystick operation is checked and if not in use, the varitimer is reset and the process low continues to T(6) where a sample and hold is performed, and the evaluation term is then converted to a 12 bit binary word representing received input level a T(7) by the ADC. The varitimer act as a delay before the process flow reenters the initial control loop at T(0) again. If the joystick is in operation at T(4), the varitimer is started and continues as long as the operator presses the four-way joystick. A test for manual control or DF is ten made. If in manual, the function selected (delay or VRPC) is incremented; at T(6) the evaluation term is sampled; at T(7) converted by the ADC to a bit binary word; and control reenter the process loop again after the varitimer times out. If the control mode has been DF, the joystick direction is determined, let for deceasing angle and right for increasing angle. The antenna delay line and VRPC memories in the angle display circuit are loaded at T(5) to select the preprogrammed delay line setting needed to form the cardioid antenna array pattern with a null at the selected angle. The evaluation terms (video) is then sampled at T6; converted to digital a T(7) for the amplitude display circuits representing the received signal level; and control again reenters the initial process flow at T(0).

Retrace the process flow back to T(3) with the function (delay or VRPC) not in limit, with the control mode selected as automatic modem or power leveling. During T(4), samples of the two successive evaluation terms are hen made by the sample timer and converted to a 12 bit binary word representing their levels. The numerical difference of the samples is formed to determine improvement or not at T(6). If no improvement occurs, the direction of the controlled function is changed. If there was improvement, the success loops and function sequence can be varied to provide a number of alternative heuristics. This is accomplished internal to the RTSNAP by a variable jumper tap. If the cycle is complete for the function under control, and both functions have been tried in the antenna element under control, the antenna address counter increments to the next antenna element before returning to the initial T(0) process flow reentry.

Figure 14:
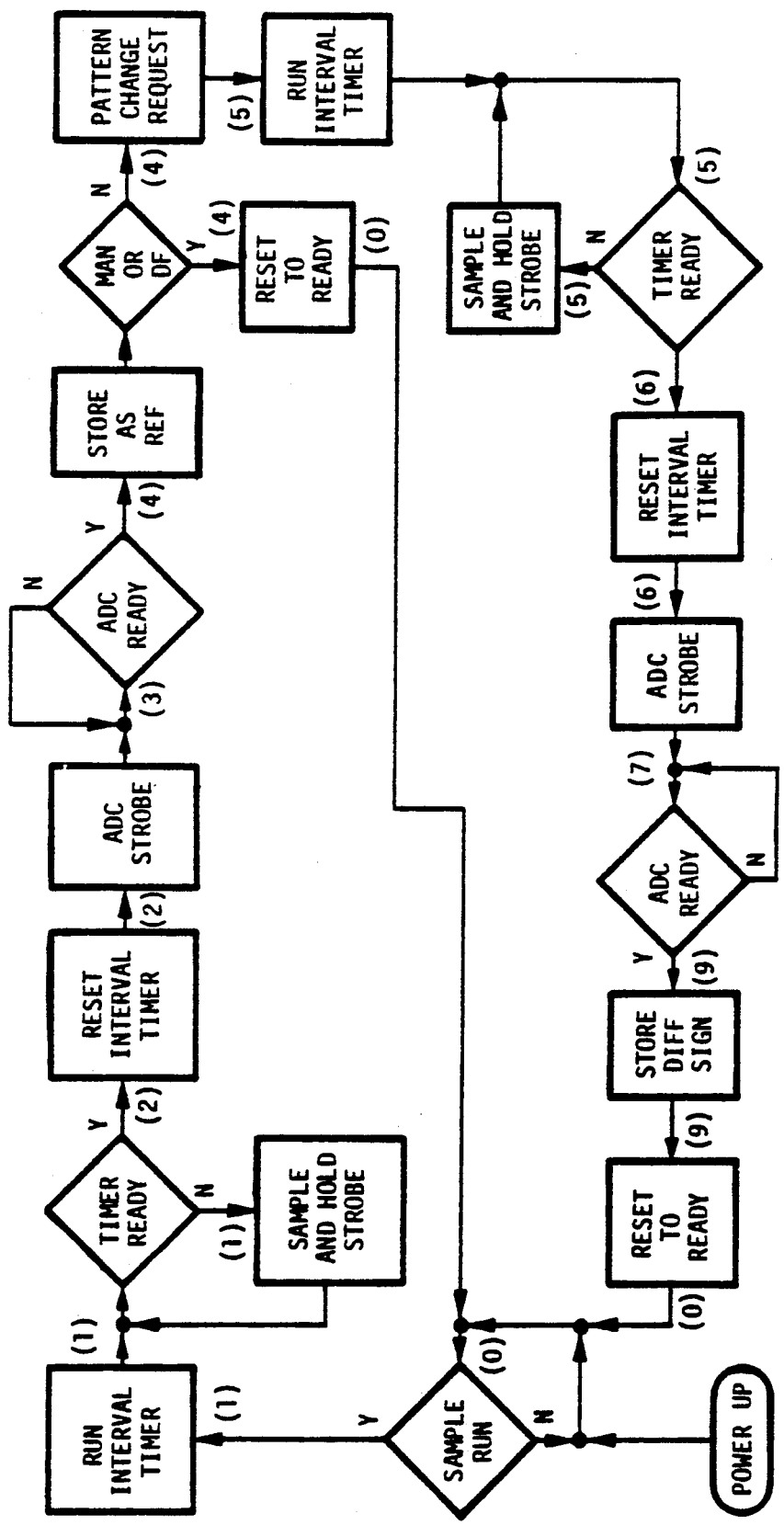
FIG. 14 is a sample timer and comparator process flow diagram.

The sample timer and comparator process flow diagram is illustrated in FIG. 14. This diagram illustrates the process flow of sampling the evaluation term, converting the sample to a 12 bit binary word by the ADC, and storage as a reference. If in automatic mode, a full sample timer cycle is requested by instructing the sample timer to run. The interval timer is run and the first sample is taken by the sample and hold circuit, changed to a 12 bit binary word by the ADC and stored. The pattern is changed, a second sample taken, digitized, and compared digitally to the first. The sign of the difference is store to indicate improvement or not of the signal environment. The sample timer process is actuated during times T(4) to T(7) of the main process flow diagram, FIG. 13. If in manual or DF control modes, n( binary comparison is required of successive samples. Only one sample is made each sample cycle, to provide input for the binary-to-decimal conversion for the amplitude LED display.

The system clock and varitimer circuit is identical to RTSNAP I, FIG. 18. The system clock is part of two two-input quad gates 1A1, 1A5 and 1A6 and is configured as a free-running multivibrator circuit whose output pulse rate is determined by two resistors 1R1 and 1R2 and a capacitor 1C1. The system clock provides the basic timing for all manual and automatic sequences. The remaining circuitry is the varitimer circuit, which is the VRPC and delay rate controlling device in the DF and manual mode. The rate at which the clock aries is determined by gates 1A1, 1A5 and 1A6 and a variable rate counter/divider circuit. The varitimer reset and start-continue pulse from the control processor are derived from initial turn-on reset, the four-way joystick, and automatic mode operation as illustrated in the logic flow diagram, FIG. 13. Since an operator may decide to go from automatic control to manual control at any time in the automatic cycle, the varitimer reset is required to initialize the timer for manual control.

Figure 25:
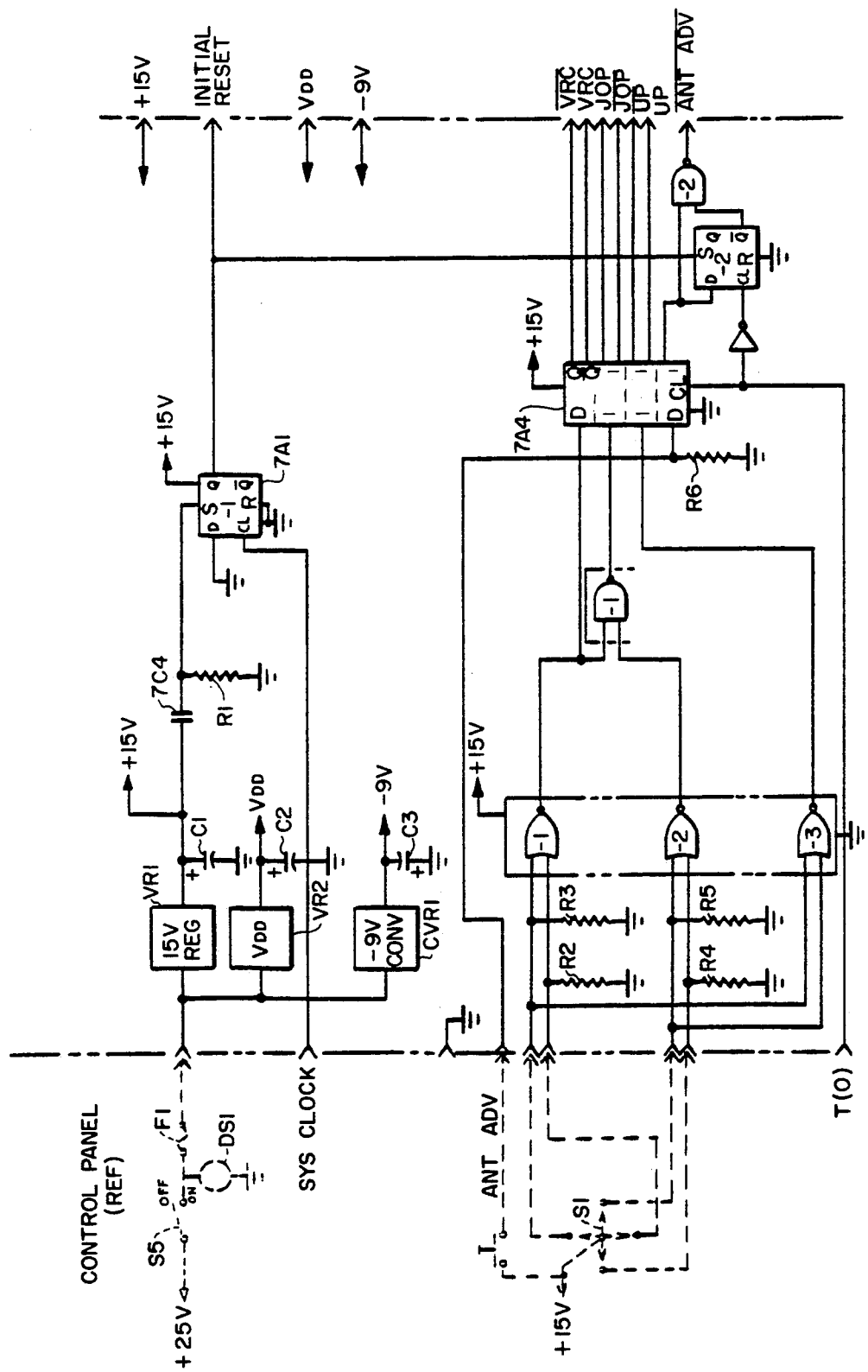
FIG. 25 is a schematic diagram of the RTSNAP II control and power circuits.

The control and power circuit, FIG. 25, provides the interface between the manual front panel controls and the primary power input, and the control processor. The front panel Power ON switch applies +25 Vdc primary power to +15 Vdc and $V_{DD}$ regulators, and also to a dc to dc converter for the −9 Vdc regulated output. The converter eliminates the requirement for a negative primary power requirement. The CMOS logic and RF switching circuits require the +15 Vdc supply and the memory circuits require $V_{DD}$ (nominally +15 Vdc) and −9 Vdc. An initial reset is generated by a differentiating circuit (resistor 7R1 and capacitor 7C4) and a set/reset flip-flop 7A1. The four-way joystick control positions, VRPC increasing or decreasing amplitude, and the delay line increasing or decreasing delay manual control instructions are gated through a quad latch 7A4. The front panel manual Antenna Advance is also processed through the latch 7A4 by the Read Controls command from the central processor.

Figure 26:
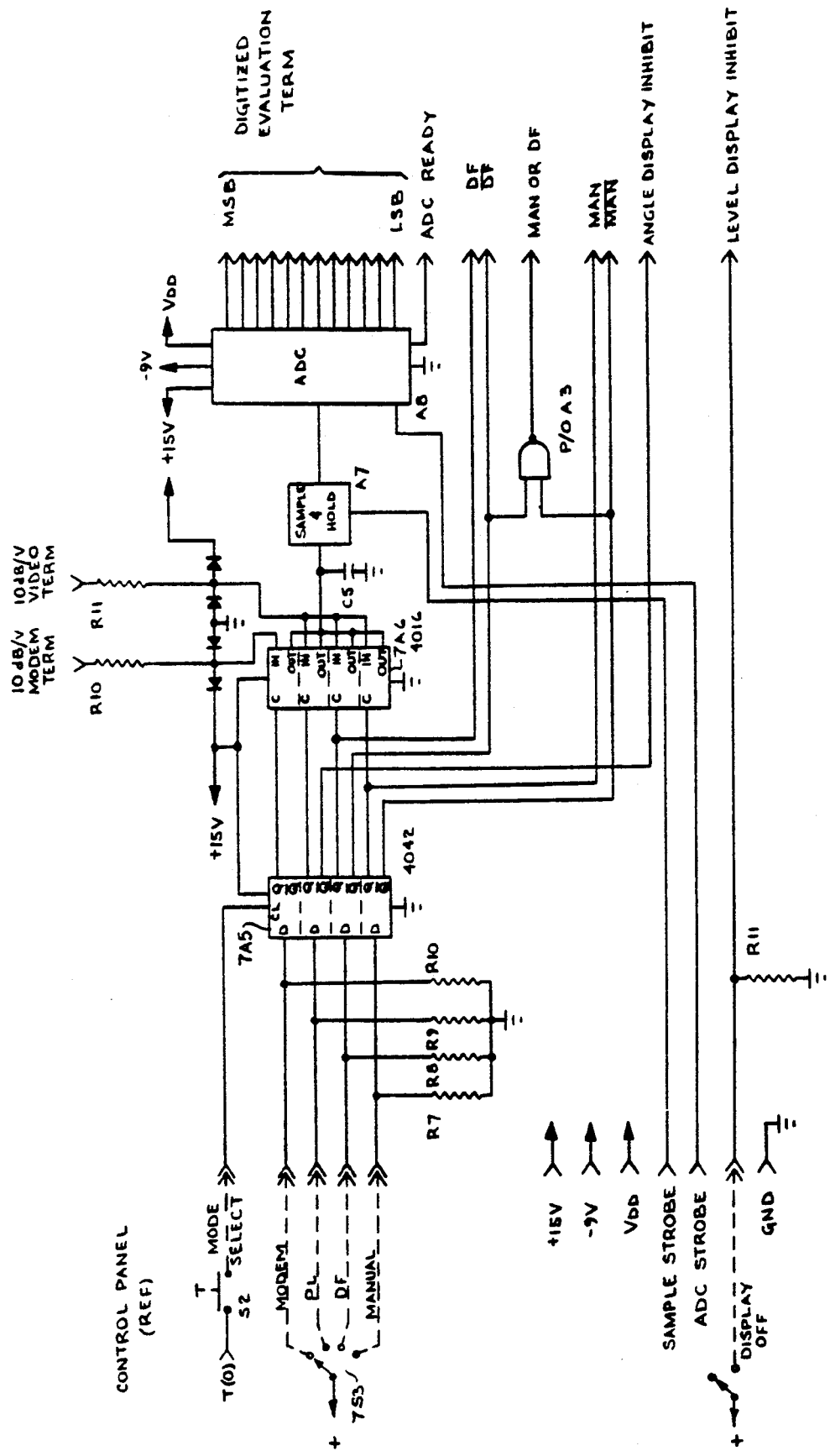
FIG. 26 is a schematic diagram of the RTSNAP II evaluation term and ADC circuits.

The evaluation term and ADC circuits shown in FIG. 26 also provide an interface between the front panel operator controls and the control processor. The operator selects the control mode of operation with a four-way rotary switch 7S3 for the automatic modes Modem and Power Leveling PL), or for the manual control modes Direction Finding (DF) and Manual. The selected mode is not activated until the operator presses the MODE SELECT pushbutton to gate the chosen mode of operation through a quad latch 7A5. The evaluation term consistent with the chosen mode of operation is selected by an analog switch 7A6. Video term is used for Manual, DF, and PL mode control. The chosen modem term, a measure of S/I, s used for Modem control. The evaluation term is retained in a sample and hold circuit by a sample strobe, FIG. 14, and then converted to a 12 bit binary word representing the amplitude level of that sample. This digitized evaluation term is applied to the amplitude display circuits to indicate the received signal level, and also to the sample binary comparator circuit for automatic control mode evaluation of improvement or not over a previous reference sample.

Figure 27:
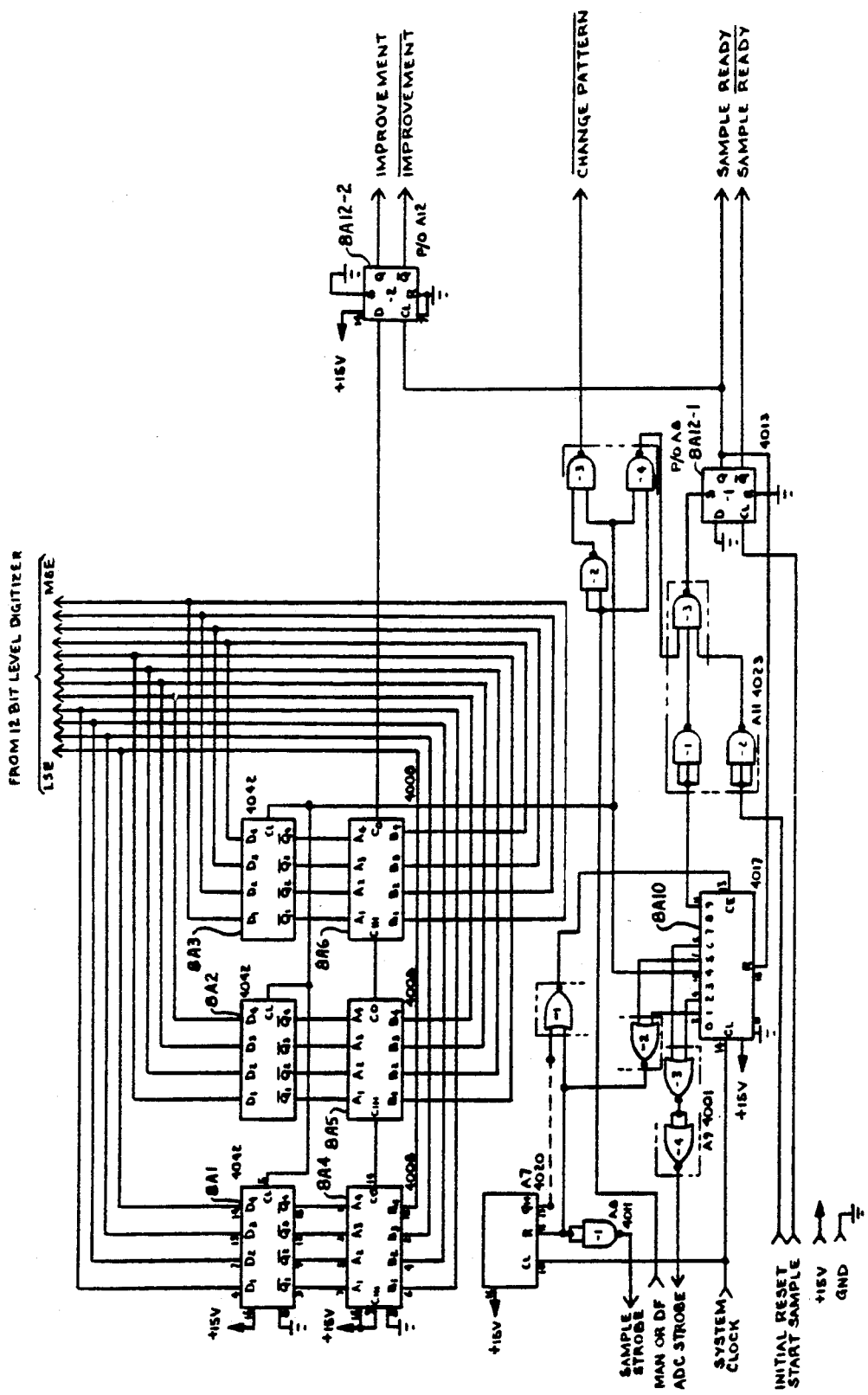
FIG. 27 is a schematic diagram of the RTSNAP II sample timer and binary comparator.

The sample timer and binary comparator circuit, FIG. 27, consists of the sample sequencer 8A10 that controls the sample-and-hold capacitor integrate and hold time, and the timing controls for the ADC strobe pulses that gate the evaluation term reference and compare samples, after n antenna pattern change. The digitized reference sample from the ADC is stored in three quad latches 7A1, 7A2 and 7A3. The second compare sample from the digitized ADC output is applied directly to three four-bit full adders 8A4, 8A5 and 8A6, and the binary difference is then stored in an improvement flip-flop 8A12-2. If the first reference sample is greater than the second, the output indicates no improvement. Improvement is indicated from the improvement flip-flop 8A12-2 for the opposite sample difference.

Figure 28:
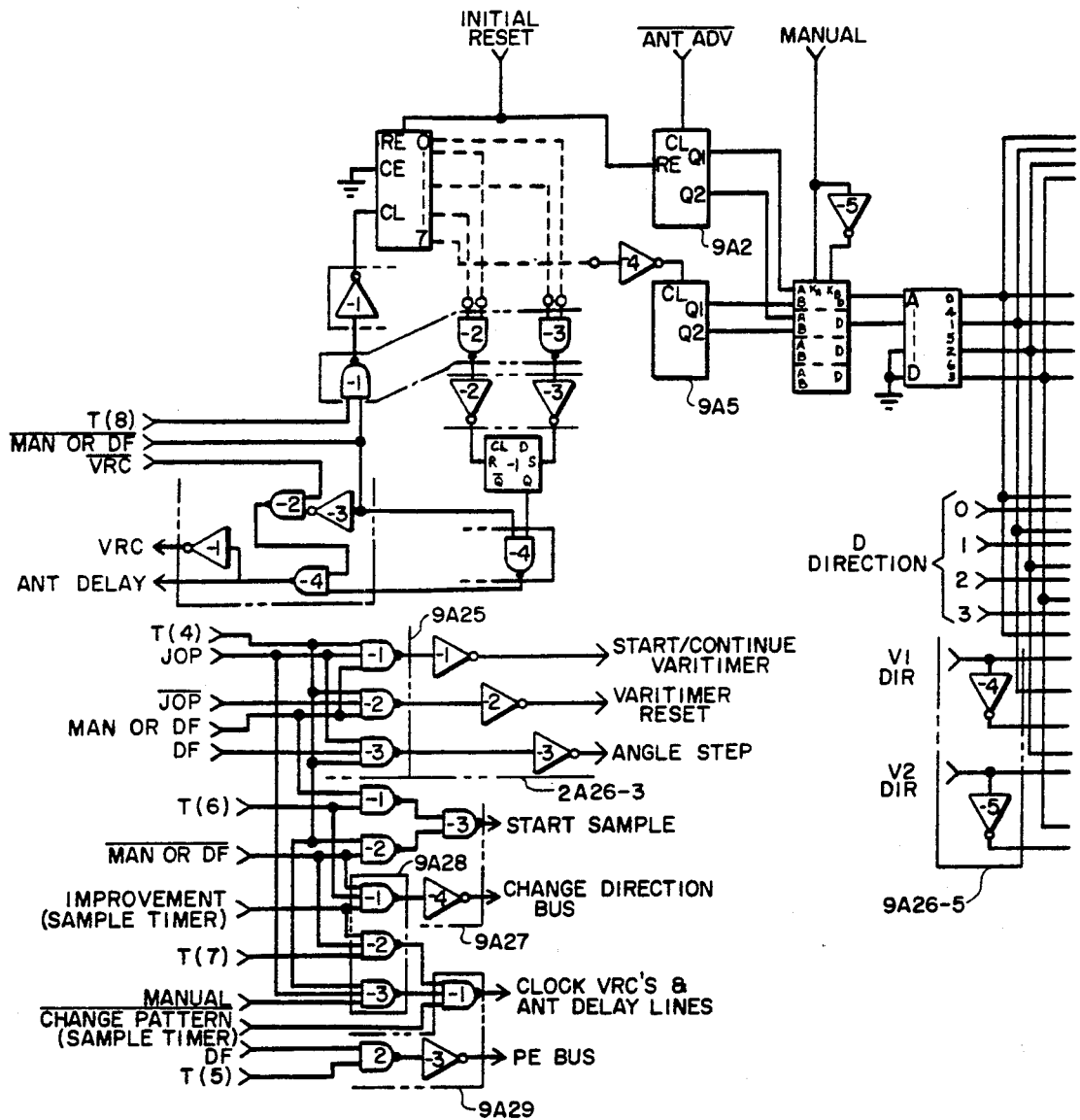
FIGS. 28 and 28A comprise a schematic diagram of the RTSNAP II control processor.
Figure 28A:
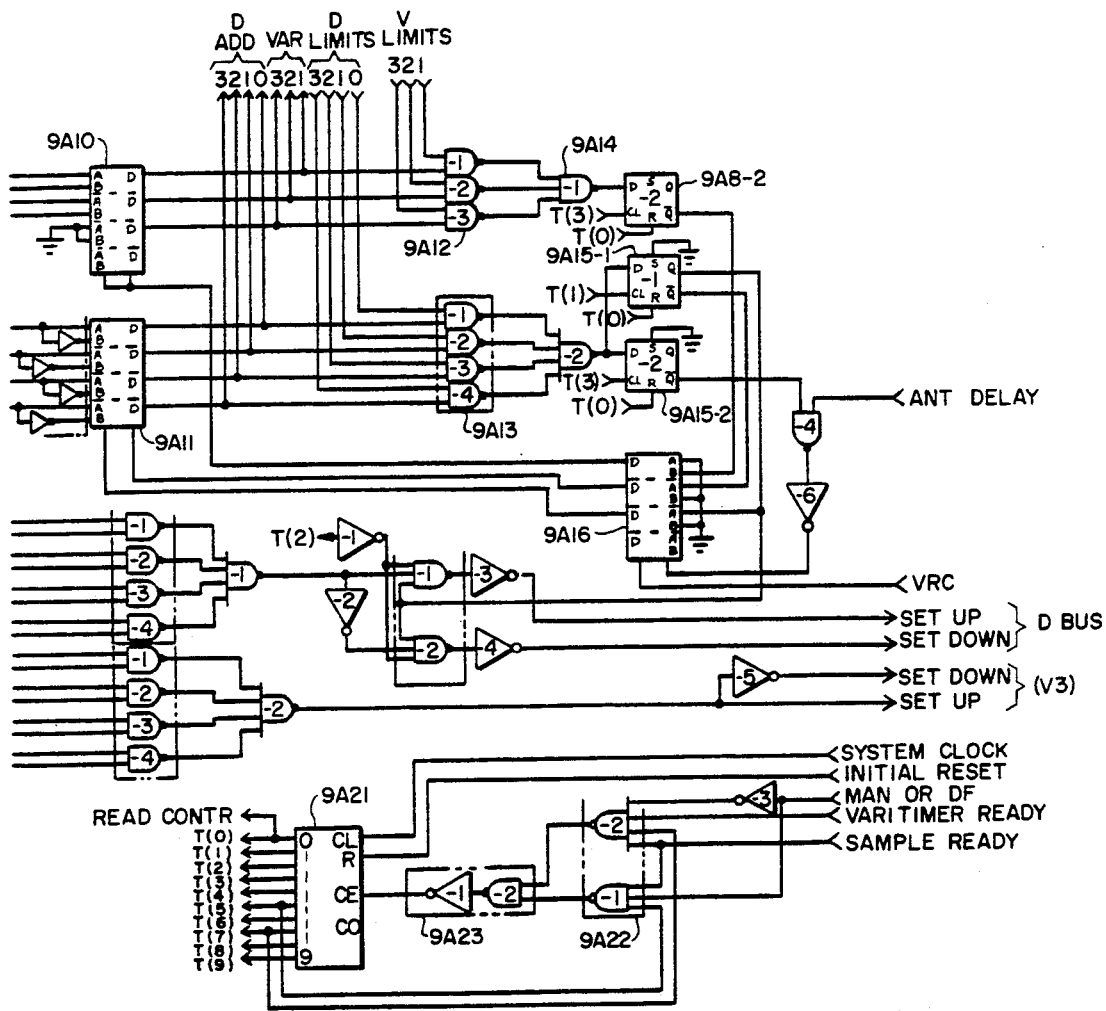

The control processor, FIGS. 28 and 28A, controls the sequence of events for the antenna de-ay lines and the VRPC antenna array pattern adjustment in the manual, DF, and automatic modes of operation. A main control sequencer 9A21 provides the basic timing for the control circuits through the process flow cycles, FIG. 13, from T(0) to T(9) for all modes of control. The varitimer clock input to the main sequencer 9A22-2 and 9A23-3 is used during the manual or D mode, while the automatic control modes use the system clock for initial timing. The Sample Ready input to the main sequencer causes a pause in the sequence while the evaluation term is sampled and converted to its digital 12 bit word by the ADC. An Antenna Advance pulse from the front panel control logic clocks two-stage antenna counters 9A2 and 9A5 in manual or automatic control modes. Manual or automatic modes select the binary antenna counters, through a select gate, to a binary antenna address decoder. The antenna address is selected by the front panel ANTENNA ADVANCE pushbutton in manual control mode, and is sequentially advanced a illustrated in the process flow, FIG. 13, for the automatic modem or PL control modes. The limits of the delay line and VRPC control the change of direction, change of function, and antenna advance for the four modes of operation 9A10 to 9A16. The basic manual and automatic controls are gated together with the main sequencer timing T(4) and T(7), in order to generate the logic commands during the sample period that will produce incremental change in the VRPC, antenna delay lines or angle display counter 9A25 to 9A29.

Figure 29A:
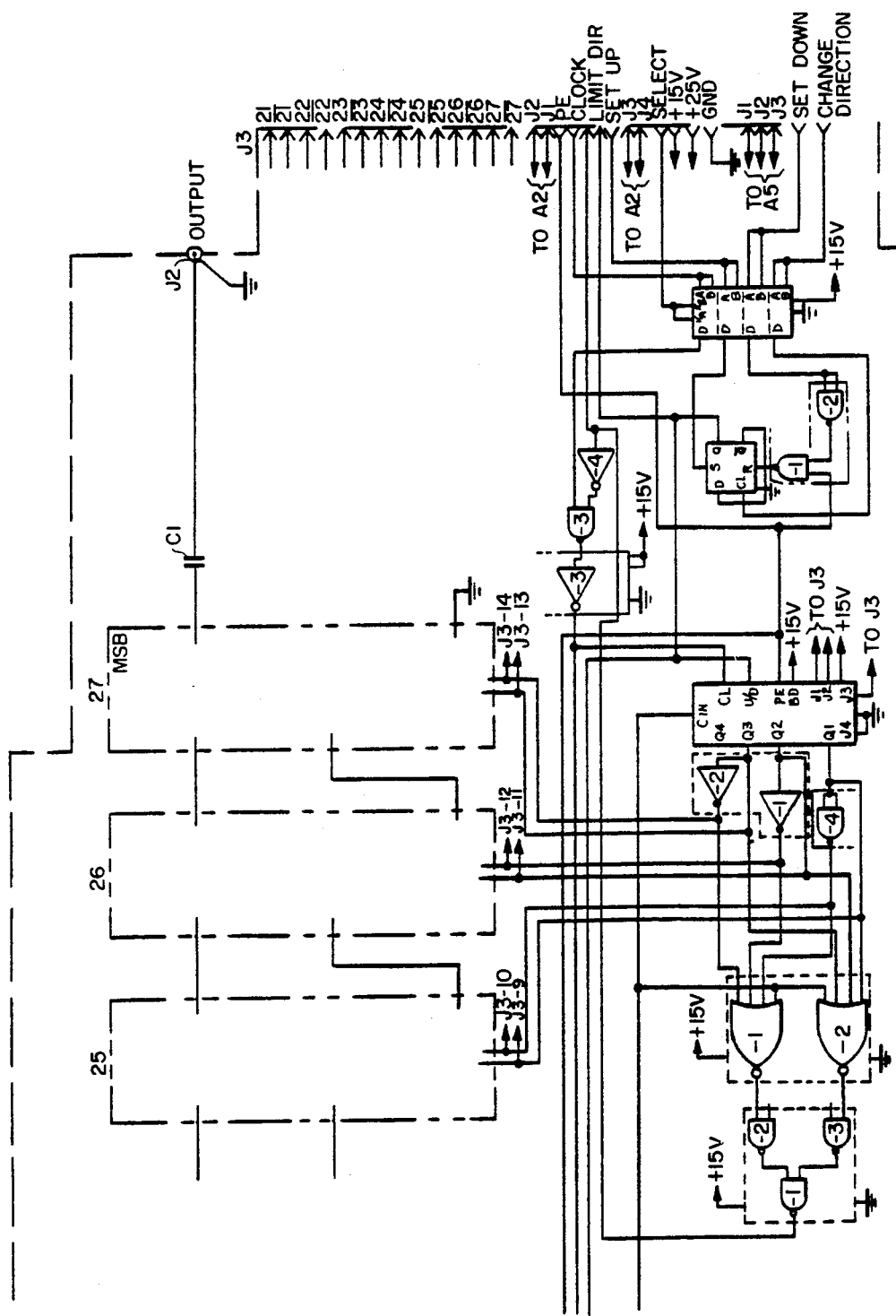

The four antenna delay lines and the delay pairs used in the VRPC are identical in RF and digital circuitry and in construction, as shown in FIG. 29. The delay lines are controlled from a seven stage up/down counter on the primary delay line. The second VRPC delay line of the VRPC module pair is driven by the inverted output of the VRPC seven-stage counter. The delay lines receive inputs from the control processor for antenna element address, direction of delay count, preset, and clock pulses. Feedback logic provides recycle and limit detection for the seven-stage counter. A limit pulse is applied to the control processor for change of direction, function, and antenna address selection. See FIG. 13 for delay line antenna address process flow when an antenna delay line or VRPC is in limit. The PIN diode DPDT switch transistor driving circuits, with constant current bias source, are identical to RTSNAP I, FIGS. 22 and 23.

For RTSNAP II, more complex relations exist in direction finding (DF) than for RTSNAP I, since three independent nulls may be generated by the four-element combination, permitting simultaneous nulling of up to three independent interference sources. To display interferer positions when simultaneous nulls occur requires a separate DF control mode. A fixed cardioid composite antenna pattern is generated in the DF mode b pre-programmed memory circuits that control the four antenna de-ay lines and three VRPC settings to produce a 360 degree null angle visual display indication in 2 degree increments, FIG. 15. The DF mode is a manual operator control mode, which is activated when he operator rotates the front panel mode selector to DF and presses the MODE SELECT push-button. When in the DF mode, the operator controls the positioning of the fixed cardioid pattern's null by means of a left-right motion of the four-way front panel joystick function control switch. A Left control direction is for deceasing angle, and a Right control direction is for increasing angle direction. The operator can then use the RTSNAP II front panel amplitude indicator in conjunction with receiver aural output to null the interferer. The same varitimer control circuits that are used in the manual nulling mod are also used in the DF mode to allow the operator the capability of rotating the cardioid null through .60 degrees rapidly for initial acquisition of an interferer, or o position the null, a step at a time, in 2 degree increments for final acquisition. An interferer's angular position is displayed in degrees on a front panel three-digit LED display. The angle display is updated continuously, but illuminated only in the DF mode. When leaving the DF mode, the nulling pattern must be reestablished in either manual, modem, or power leveling null control modes.

Figure 30:
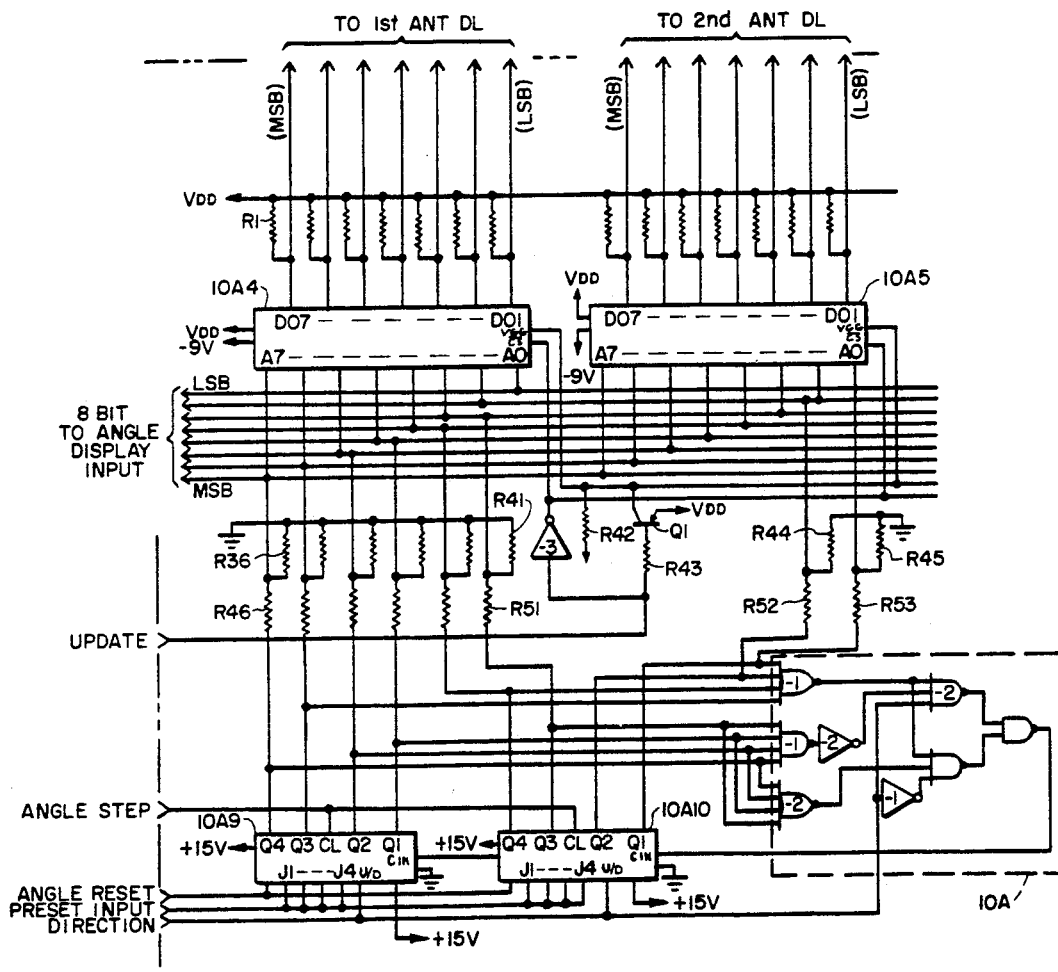
FIGS. 30 and 30A comprise a schematic diagram of the RTSNAP II direction finding storage and display circuits.
Figure 30A:
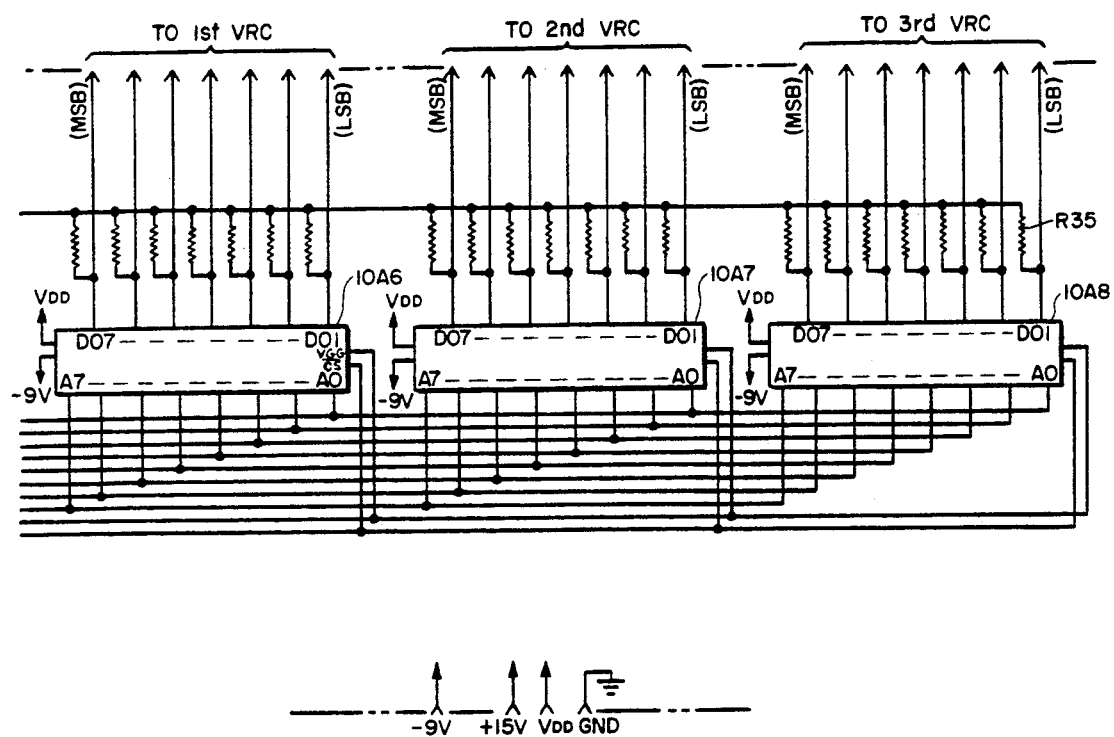
Figure 31:
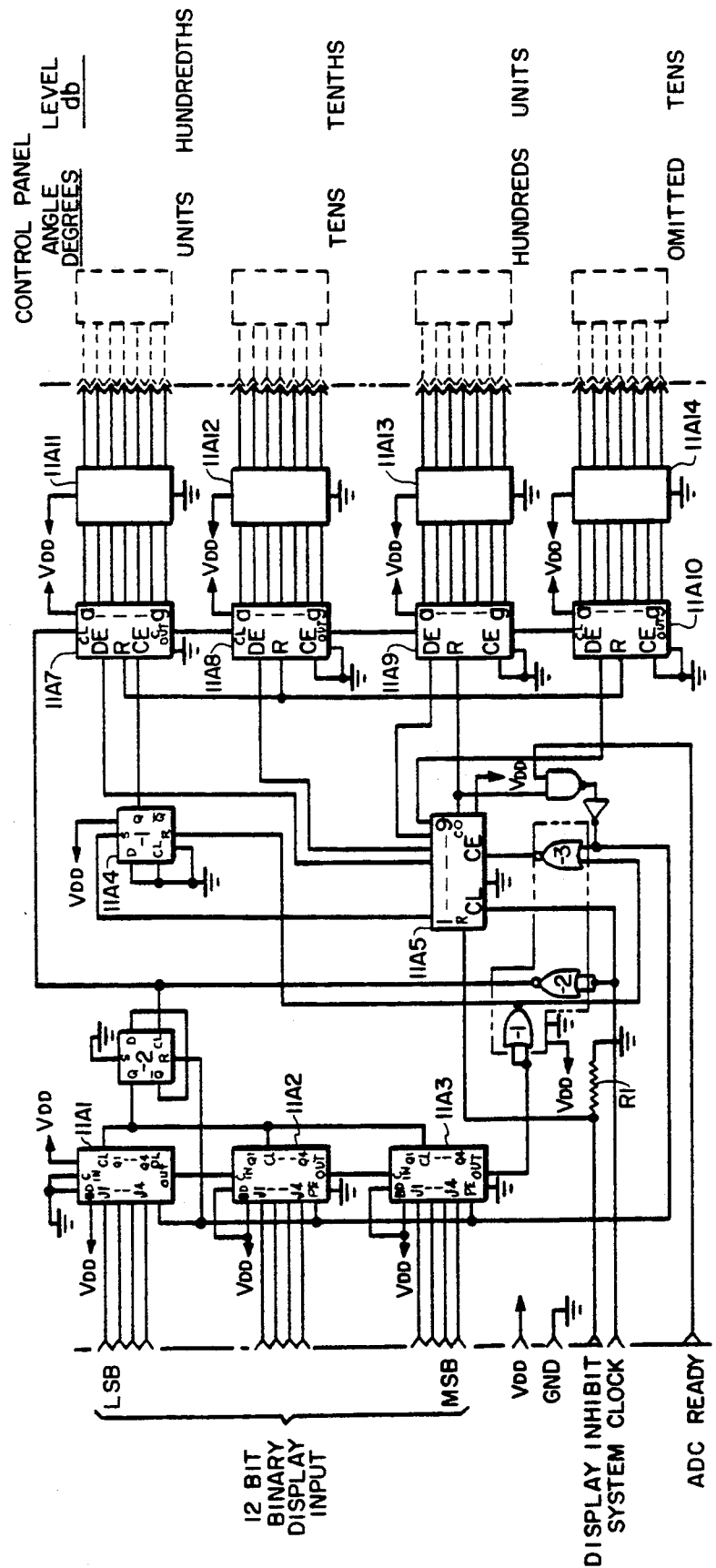
FIG. 31 is a schematic diagram of the RTSNAP II digital display circuits.

The DF control, storage, and display circuits are shown in FIGS. 30, 30A and 31. When the operator presses the front panel MODE SELECT pushbutton in the DF mode, the eight-stage up-down counter 10A9 and 10A10 is preset to output an eight-bit bit word representing the angular positioning of the cardioid null to the antenna delay line and VRPC emory circuits 10A4, 10A5, 10A7 and 10A8. The read-only-memories (ROM) are pre-programmed in 2 degree angle increments for a 60 degree rotation of the DF cardioid antenna pattern. The delay line ROM controls alternate pairs of antenna delay lines, with the ROM 10A4 output going to antenna delay line D1 and its complement output to D3, and the ROM 10A5 output going to antenna delay line D2 with its complement output to D4. Alternate pairs of antenna delay lines in the four-antenna array are, therefore, controlled differentially. The three memories 10A6, 10A7 and 10A8 are also programmed to produce the cardioid pattern and it rotation in 2 degree increments. VRPC1 is common to antenna delay line D1 and D2, VRPC2 is common to D3 and D4, and their outputs are combined through VRPC2, FIG. 7. Counters 10A9 and 1A10 can be continuously recycled through 360 degrees by the feedback recycle logic 10A, an the controls need not be reversed when the count limit is reached.

The eight-bit output from he angle counter 10A9 and 10A10 is also applied to the display circuits, FIG. 31, and to the jam inputs of the parallel-to-serial counter 11A1 and 11A2. Counter 11A3 is required only in the amplitude display circuit, which has a 12-bit parallel input. Therefore, counter 11A3 is eliminated in the delay display circuit, which requires only an eight-parallel-bit input word. The remaining display circuit description and operation i very similar to the RTSNAP I display circuits FIG. 24A, with the exception of the clock divide-by-two circuit, which is required to accommodate the digital-to-analog conversion for 2 degree angle resolution. Counter 11A1 and 11A2, FIG. 31 is always forced to count down. When the operator presses the front panel DF MODE SELECT pushbutton, a display inhibit pulse is removed from a display sequencer nine-stage counter 11A5. The display sequencer begins counting with the system clock once the inhibit has been removed, and sets a gate 114 to prepare for the sequential readout of the null angle setting. After a count of four, a Carry Cut pulse from the display sequencer jams the eight input lines from the ROM's storage latch into the eight-stage parallel-to-series counter 11A1 and 11A2.

The display sequencer will pause until the binary-parallel-to-series counter counts down to all zeros from its present jam input representing the angle. A carry-out pulse from the parallel-to-series counter 11A2 steps the display sequencer one count, and then the counter 11A1 and 11A2 recycles to its maximum count and counts down again to all zero. As the eight-stage parallel-to-series counter 11A1 and 11A2 counts down to zero, the clock also counts the three cascade binary-to-decimal counters 11A7, 11A8 and 11A9 up by the same count, but at twice the rate of 11A1 and 11A2. When a Carry Out pulse occurs at 11A for all zeros in the counter 11A1 and 11A2 output, an inhibit pulse through 11A4 is generated to inhibit further counting of the binary-to-decimal decoders 11A7, 11A8 and 11A9. The binary-to-decimal decoder 11A10 and 11A14 not needed for the three-digit LED angle display, and is used only in the amplitude display circuit. For the next three cycles of the eight-stage counter 11A1 and 11A2, the display sequencer is advanced three times, to strobe the BCD decoder 11A7, 11A8 and 11A9 decode bus DE first in units, then tens, then in hundreds of degrees. This strobing conserves power consumed by the LED display, ad it is at a fast enough rate that the display appears to be continuous. The null angle LED display is continuously updated during the DF mode, and is not operative during the manual, modem, or power leveling control modes.

Figure 16:
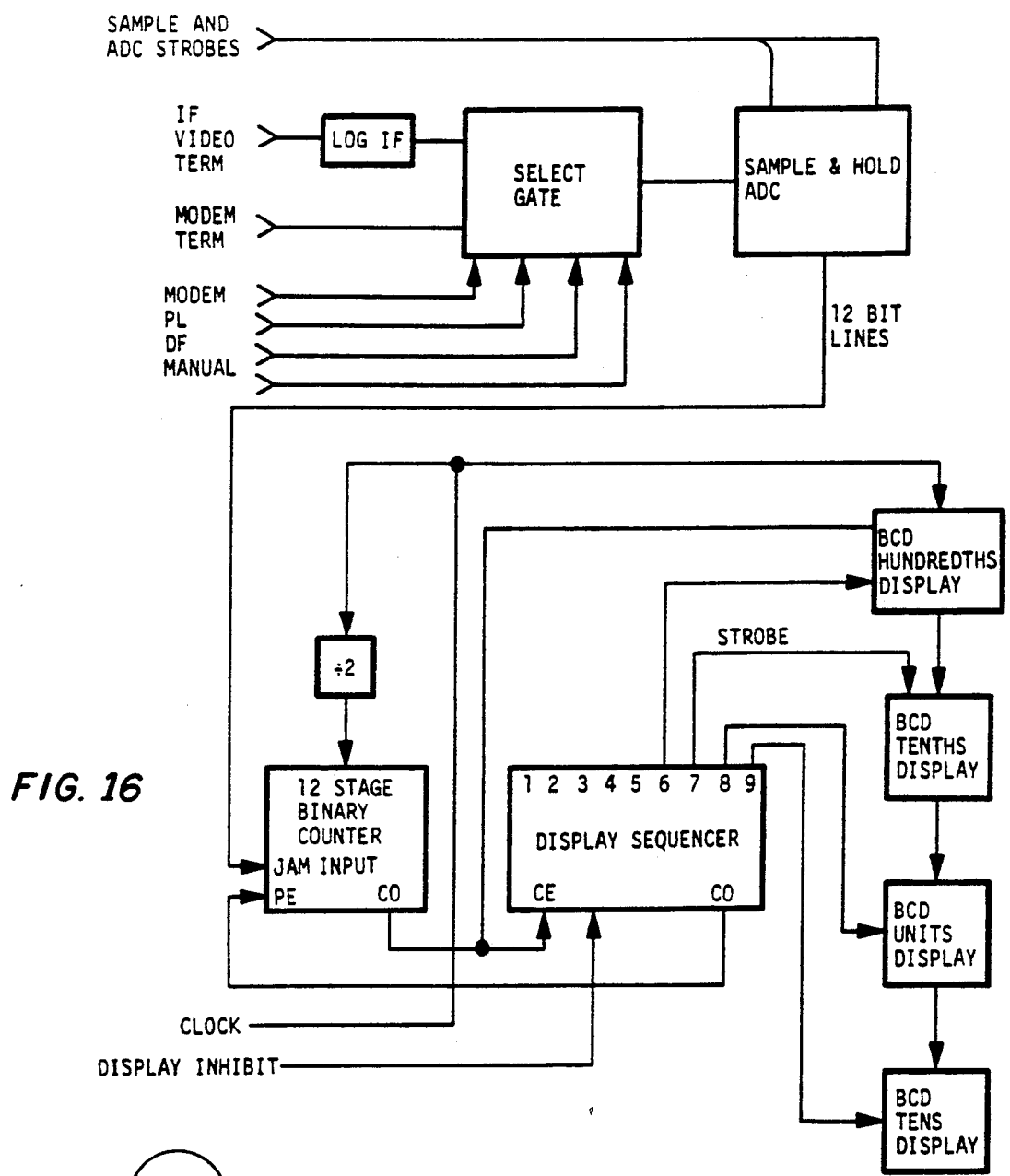
FIG. 16 is a block diagram of the RTSNAP II amplitude display circuit.

A similar digital display circuit, shown in FIG. 31, is used for the amplitude display circuit. The 12 bit binary word representing the received input level from the ADC, FIG. 26, is applied to a 12-stage parallel-to-series counter shown in FIG. 16. The rest of the display circuit operation is similar to that just described in the angle display circuit description. In the amplitude display circuit operation the ADC Ready performs as the amplitude binary-to-decimal converter and LED display are added to provide a four-digit LED display to 99.99 dB, with 0.02 dB amplitude resolution. The LED display reads directly in dB, and covers the total receiver input dynamic range with no amplitude offset requirement. The amplitude display is actuated by an operator front panel DISPLAY ON-OFF switch. The received amplitude level in dB can be displayed during any of the four selected modes of operation; Manual, DF, PL, or Modem.

VARIABLE PHASE AND AMPLITUDE CIRCUITS

This section describes the variable phase and amplitude control for the antenna array elements for both the VHF and UHF systems. See my patent application, Ser. No. 180554 on a Switched Delay Line for Steerable Null Antenna System, which is incorporated by reference, for more detail.

Figure 17:
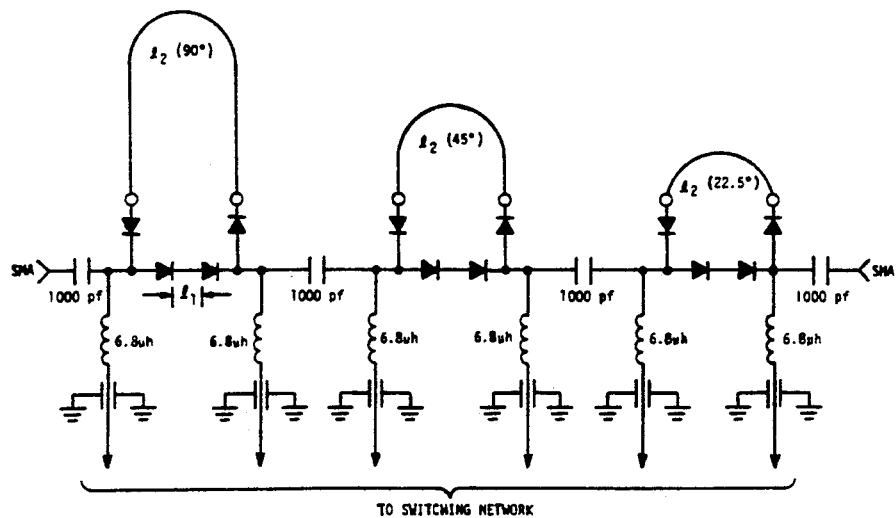
FIG. 17 is a schematic diagram of a 3-bit phase shifter.

The delay lines used in the variable phase and amplitude circuits are each a seven-bit binary switched delay line. The switching devices are PIN diodes, such as Unitrode type 7906E. A three-bit delay line is shown schematically in FIG. 17. Each element (bit) comprises a principal section of transmission line with a PIN diode in series at each end, and a short section of line for the "off" state linewise having two PIN diodes in series, one at each end. The "on" section diodes are oriented in one direction, and the "off" diodes in the opposite direction. For each element there are two 6.8-microhenry inductors connecting the diodes to a source of bias current for switching the diodes in response to signals from the controller. The elements are separated by 1000-picofarad capacitors. The lengths of the lines are related in a binary manner so that the effective difference in delay between the "on" and "off" states for each element is one half that of the preceding element. The lines may be either stripline or microstrip.

The variable-ratio power combiner (VRPC) provides a means of amplitude control for RTSNAP I and RTSNAP IL vector multi-RF circuits. This device offers broadband, reciprocal receive/transmit capability at high power levels and minimum insertion loss. The RF circuit configuration for the RTSNAP II vector (30 to 80 MHz) and RTSNAP II (225 to 400 MHz) variable-ratio power combiner is nearly identical, with the four-antenna-element array RTSNAP II consisting of two combined RTSNAP I designs. The switched delay line lengths and two hybrid couplers are scaled to accommodate the RTSNAP I and RTSNAP II operating frequencies.

The VRPC provides continuous variation of RF signal power between two output ports (transmit mode) in any desired ratio. The device is bilateral and can also be used to combine two signals with a variable combining ratio to a single output port (receive mode). Therefore, the VRPC can be used in a RTSNAP receive or transmit mode of operation as illustrated in a basic circuit configuration of FIG. 5. This basic circuit consists of two-antenna input quadrature coupler H1, two variable delay lines DL3 and DL4, and a 0/180 degree hybrid combiner H2 for a single output to the transceiver. The variable power division is obtained by controlling the phase of one half of the incoming signal by delay line DL3 with respect to the RF energy in delay line DL4. In the receive mode, control of the variable delay lines varies the phase relationship of the two quadrature signals from ports H1C and H1D before they arrive at ports H2A and H2B. The phase relationship of the energy arriving at H2A and H2B terminals determines the ratio of power coupling to the output port H2D. Output amplitude at H2C and H2D of H2 will vary as a sine or cosine function with incremental variations of delay line DL3 with respect to DL4. Hybrid port H2C is normally terminated in a 50-ohm load as an isolation port In the transmit mode, the high-level transmit energy enters port H2D and is divided equally in amplitude, 180 degrees out of phase, at ports H2A and H2B. Delay lines DL3 and DL4 again control the phase relationship of the two RF signals arriving at quadrature inputs H1C and H1D of hydrid H1. This phase relationship of the two signals at H1C and H1D determines the ratio of power coupling to each antenna port. This basic VRPC design configuration is used for both RTSNAP I and RTSNAP II as a means of amplitude control in each antenna leg. Variable delay lines DL3 and DL4 are configured as seven-bit PIN diode binary switched line phase shifters or time delay devices with phase shift proportional to frequency. For the RTSNAP application, if the binary delay line bits are switched in equal and opposite delay increments, the output differential phase is kept constant with switched delay line variations.

While a limited number of embodiments have been illustrated and described, other variations may be made in the particular design and configuration without departing from the scope of the invention as set forth in the appended claims.

What is claimed is:

1. Null indication apparatus in a steerable null antenna processor system for receiving desired wave energy signals from at least one angular region of space within the area covered by the system and for suppressing interfering signals from a plurality of other angular regions comprising:

antenna means having at least three antenna elements and a common port;

nulling means coupled between said antenna elements and said common port for supplying said desired wave energy signals to said common port, said nulling means including phase means and amplitude means, said phase means and amplitude means being adjustable and having control inputs operative in response to control signals to adjust the respective phase and amplitude values of said nulling means;

digital controller means including clock means, sample storage means, comparison means, feedback input means, and phase and amplitude memory means coupled to said control inputs of the respective phase and amplitude means;

feedback signal means between said common port and said feedback input means supplying feedback signals containing a representative level of the interfering signals at the common port, said clock means supplying clock signals to provide successive cycles, said comparison means being connected and operative during each cycle to compare a feedback signal from said feedback input means to a previous sample thereof stored in said sample storage means to indicate a change and to supply said control signals via said memory means to said nulling means to adjust the steering of a null to different interfering signals; and said null indication apparent further including display means, angle counter means, and a read only memory, said read only memory having outputs coupled to said control inputs of said nulling means and containing information for generating a cardioid pattern with a single null rotatable in fixed increments, said angle counter means having inputs coupled to said digital controller means and outputs coupled to said display means and to said read only memory, said digital controller means having a manually controllable direction finding mode to selectively vary said angle counter means output signals to steer said cardioid pattern via said read only memory to said nulling means and cause the angle of the null to be displayed by said display means.

2. Null indication apparatus in a steerable null antenna processor system for receiving wave energy signals from at least one angular region of space within the area covered by the system and for suppressing interfering signals from at least one other angular region comprising:

antenna means having at least first and second antenna elements and a common port;

nulling means coupled between said antenna elements and said common port for supplying said desired wave energy signal to said common port, said nulling means including phase means and amplitude means, said amplitude means being a variable ratio combiner including a quadrature hybrid and a sum-difference hybrid and two variable delay lines adjustable in incremental steps, each hybrid having a first, a second, a third and a fourth port, one of said delay lines being connected from said third port of a first of said hybrids to said first port of a second of said hybrids, and the other said delay line being connected from said fourth port of said first hybrid to said second port of said second hybrid, said common port being the fourth port of the second hybrid, and said third port of the second hybrid being an isolation port connected to a termination impedance, said phase means including two delay lines which are incrementally adjustable, one delay line being connected from said first antenna element to said first port of said first hybrid and the other delay line being connected from said second antenna element to said second port of said first hybrid;

memory means to store digital signals for setting said delay lines to selected steps including phase memory means connected to control inputs of said delay lines of said phase means, and amplitude memory means connected to control inputs of said delay lines of said amplitude means, said two delay lines of said amplitude means being controlled respectively with signals in said amplitude memory and the complement thereof so that they are switched with equal and opposite delay increments and the output differential phase is kept constant with switched delay line variations;

control means to control the digital signals in said memory means to determine the directions of said angular regions; and null angle indication means having angle display means coupled to said memory means to provide a display representing the direction of a null.

3. Apparatus as set forth in claim 2 including third and fourth antenna elements having a second common port, and second nulling means having a second phase means and a second amplitude means coupled to said third and fourth antenna elements and second port in a like arrangement to said nulling means coupled to said first and second antenna elements;

third amplitude means coupled between said first and second common ports and a third common port coupled to said apparatus;

second phase memory means connected to control said second phase means, and second and third amplitude memory means connected respectively to control said second and third amplitude means;

said null indication apparatus further including angle counter means and a read only memory, said read only memory means having outputs coupled to said delay lines of both said phase means and said amplitude means to control the adjustment thereof, said read only memory means containing information for generating a cardioid pattern with a single null rotatable in increments, said angle counter means having inputs coupled to said control means and outputs coupled to said angle display means and to said read only memory means, said control means having a manually controllable direction finding mode to selectively vary said angle counter means output signals to steer said cardioid pattern via said read only memory means to said nulling means and cause the angle of the null to be displayed by said angle display means.

4. Apparatus as set forth in claim 3, wherein said read only memory means includes five read only memories, one read only memory controlling one delay line and another read only memory controlling the other delay line of each of said first and second phase means, and the other three read only memories controlling the respective delay lines of the first, second and third amplitude means.

5. Apparatus as set forth in claim 4, wherein the null indication apparatus includes an eight-stage binary counter coupled to the outputs of the angle display counter, a clock source, a divide-by-two circuit coupled between said clock source and said eight-stage binary counter, and a display sequencer coupled between said eight-stage binary counter and said angle display means.

6. Null indication apparatus in a steerable null antenna processor system for receiving desired wave energy signals from at least one angular region of space within the area covered by the system and for suppressing interfering signals from at least one other angular region comprising:

antenna means having at least first and second antenna elements and a common port;
nulling means coupled between said antenna elements and said common port for supplying said desired wave energy signals to said common port; said nulling means including phase means and amplitude means adjustable in incremental steps and having control inputs operative in response to control signals to adjust the respective phase and amplitude values of the nulling means;
digital controller means including clock means, sample storage means, comparison means, feedback input means, and phase and amplitude memory means coupled to said control inputs of the respective phase and amplitude means; feedback means between said common port and said feedback input means supplying feedback signals containing a representative level of the interfering signal at the common port, said clock means supplying clock signals to provide successive cycles, said comparison means being connected and operative during each cycle to compare a feedback signal from the feedback input means to a previous sample thereof stored in said sample signals via said memory means to said nulling means to adjust the steering of one null to interfering signals;
said null indication apparatus further including null angle indication means having read only memory means and angle display means coupled to said memory means to provide a display representing the direction of a null.

7. Apparatus as set forth in claim 6, wherein said null indication apparatus further includes a null depth indicator for displaying the amplitude.

* * * * *